(12) United States Patent
Takahashi

(10) Patent No.: US 7,602,170 B2
(45) Date of Patent: Oct. 13, 2009

(54) PROBE, MANUFACTURING METHOD OF THE PROBE, RECORDING APPARATUS, AND REPRODUCING APPARATUS

(75) Inventor: Hirokazu Takahashi, Saitama (JP)

(73) Assignee: Pioneer Corporation, Tokyo (JP)

( * ) Notice: Subject to any disclaimer, the term of this patent is extended or adjusted under 35 U.S.C. 154(b) by 430 days.

(21) Appl. No.: 11/661,104

(22) PCT Filed: Aug. 26, 2005

(86) PCT No.: PCT/JP2005/015576

§ 371 (c)(1), (2), (4) Date: Mar. 19, 2007

(87) PCT Pub. No.: WO2006/022388

PCT Pub. Date: Mar. 2, 2006

(65) Prior Publication Data

US 2007/0279043 A1   Dec. 6, 2007

(30) Foreign Application Priority Data

Aug. 27, 2004   (JP) .............................. 2004-248579

(51) Int. Cl.
*G09B 9/002* (2006.01)
*G09B 9/012* (2006.01)

(52) U.S. Cl. ..................... 324/149; 369/126; 700/197

(58) Field of Classification Search ................. None
See application file for complete search history.

(56) References Cited

U.S. PATENT DOCUMENTS 5,959,957 A * 9/1999 Ikeda et al. .................. 369/127
7,115,863 B1 * 10/2006 Ishibashi et al. ............ 250/306

FOREIGN PATENT DOCUMENTS

JP   6-188385 A   7/1994
JP   2003-085969 A   3/2003

* cited by examiner

*Primary Examiner*—Paul Huber
(74) *Attorney, Agent, or Firm*—Nixon & Vanderhye P.C.

(57) ABSTRACT

A probe (100) is provided with: a support member having a through-hole in at least one portion thereof; a projection standing on the support member with its tip facing a medium; and a conductive film formed to cover at least a partial surface of the support member including a side surface of the through-hole.

17 Claims, 15 Drawing Sheets

(a)

(b)

[FIG. 1]
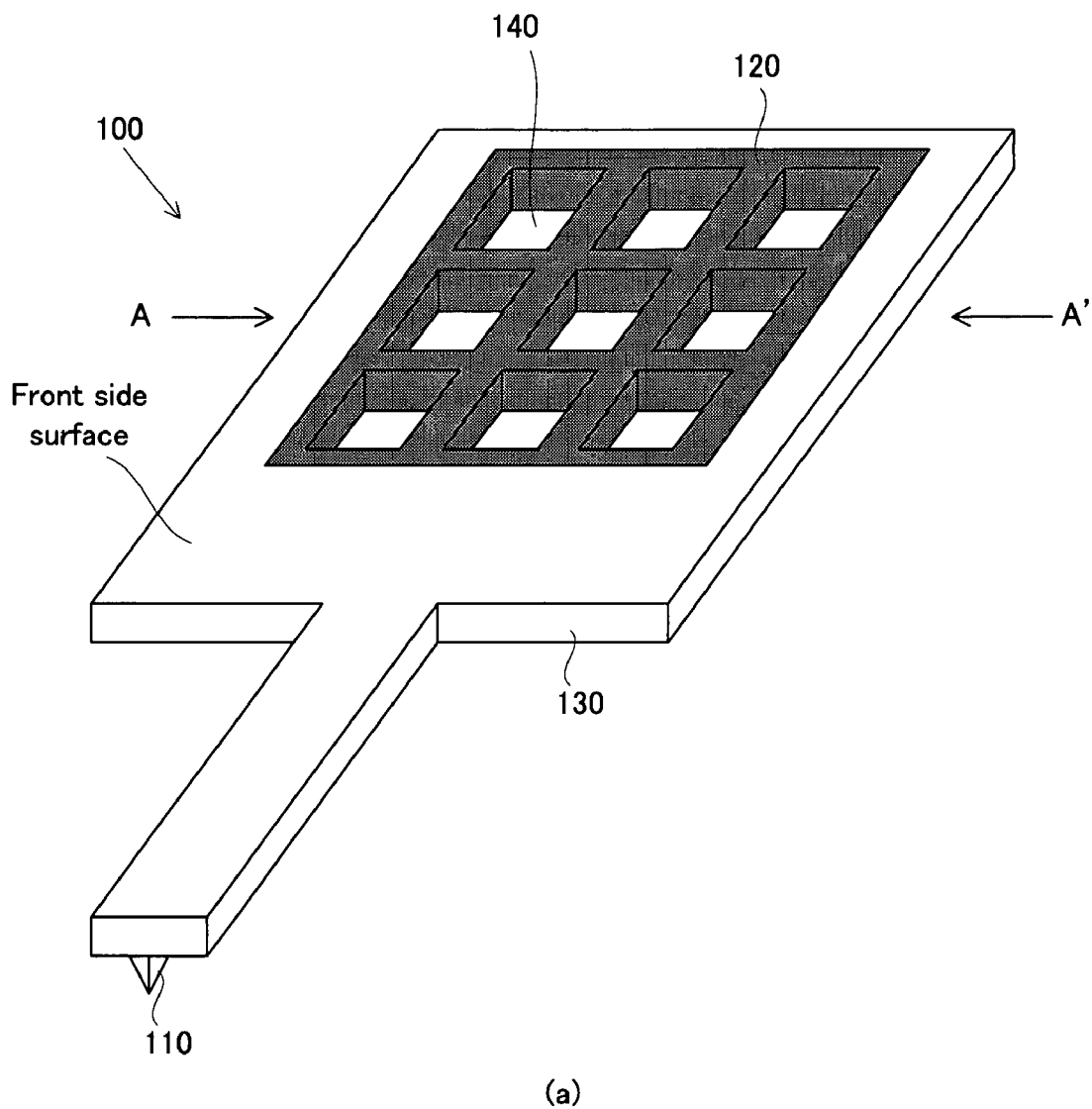
(a)
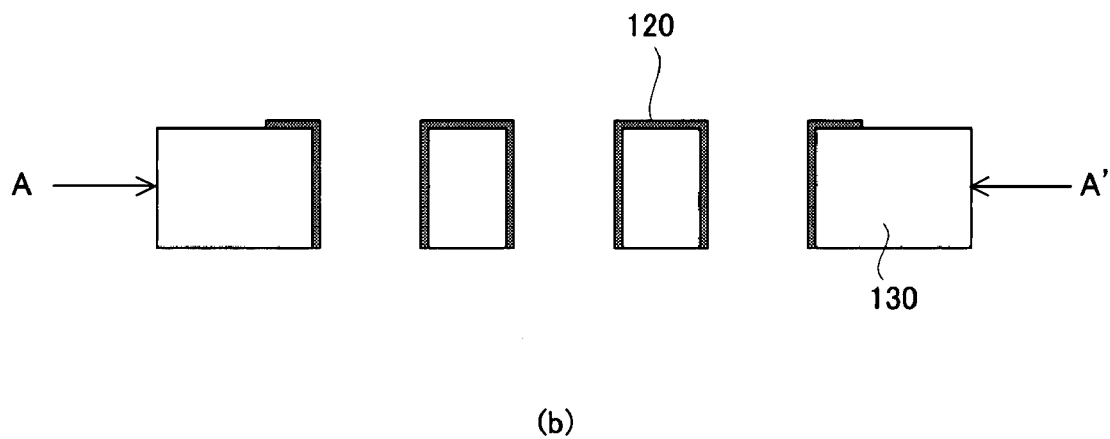
(b)

[FIG. 2]
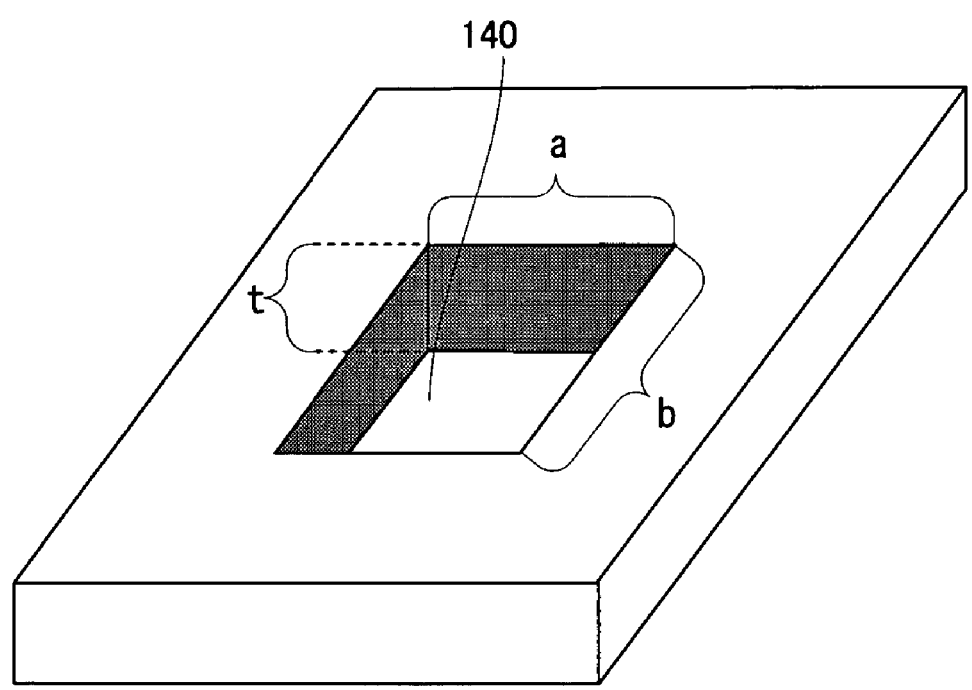

[FIG. 3]
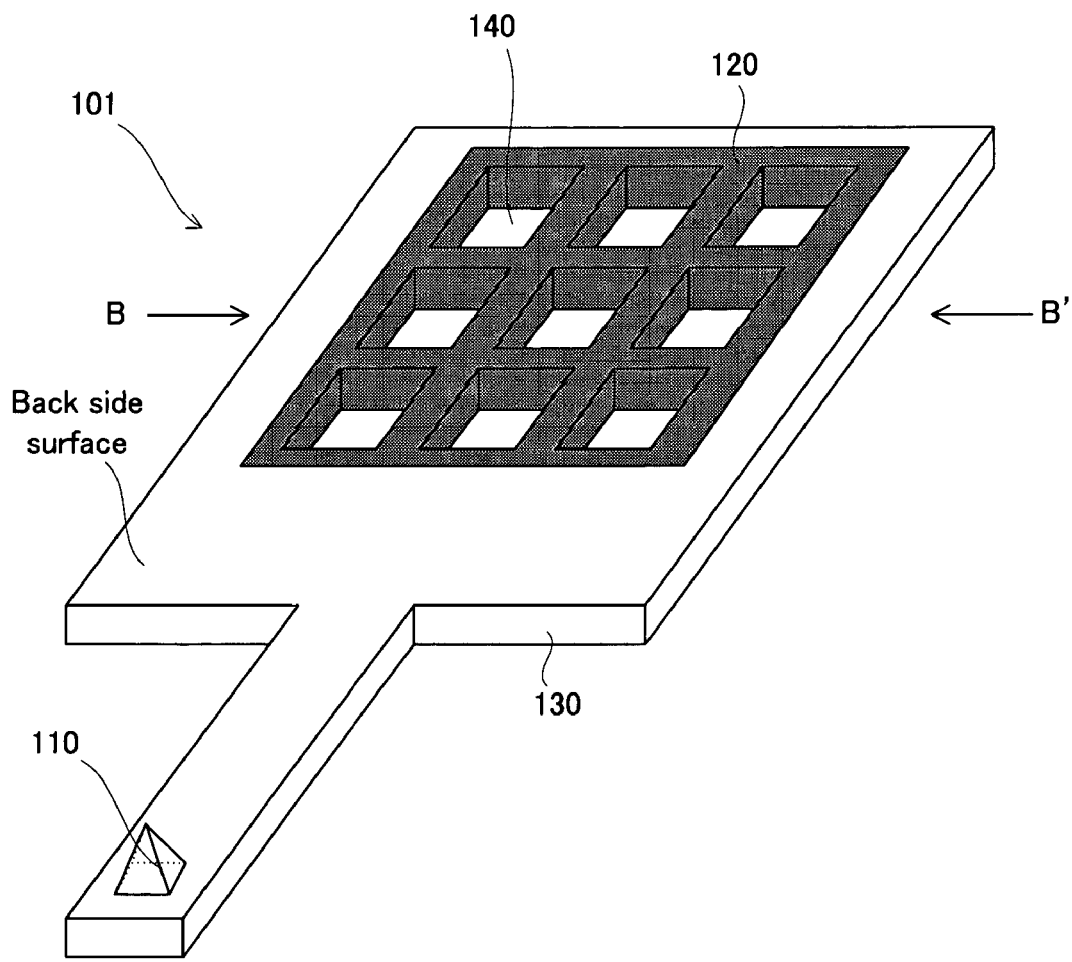
(a)
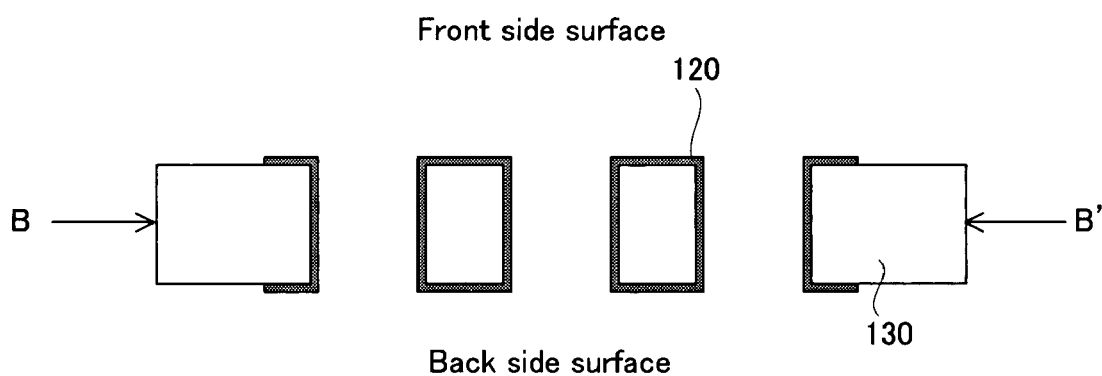
(b)

[FIG. 4]
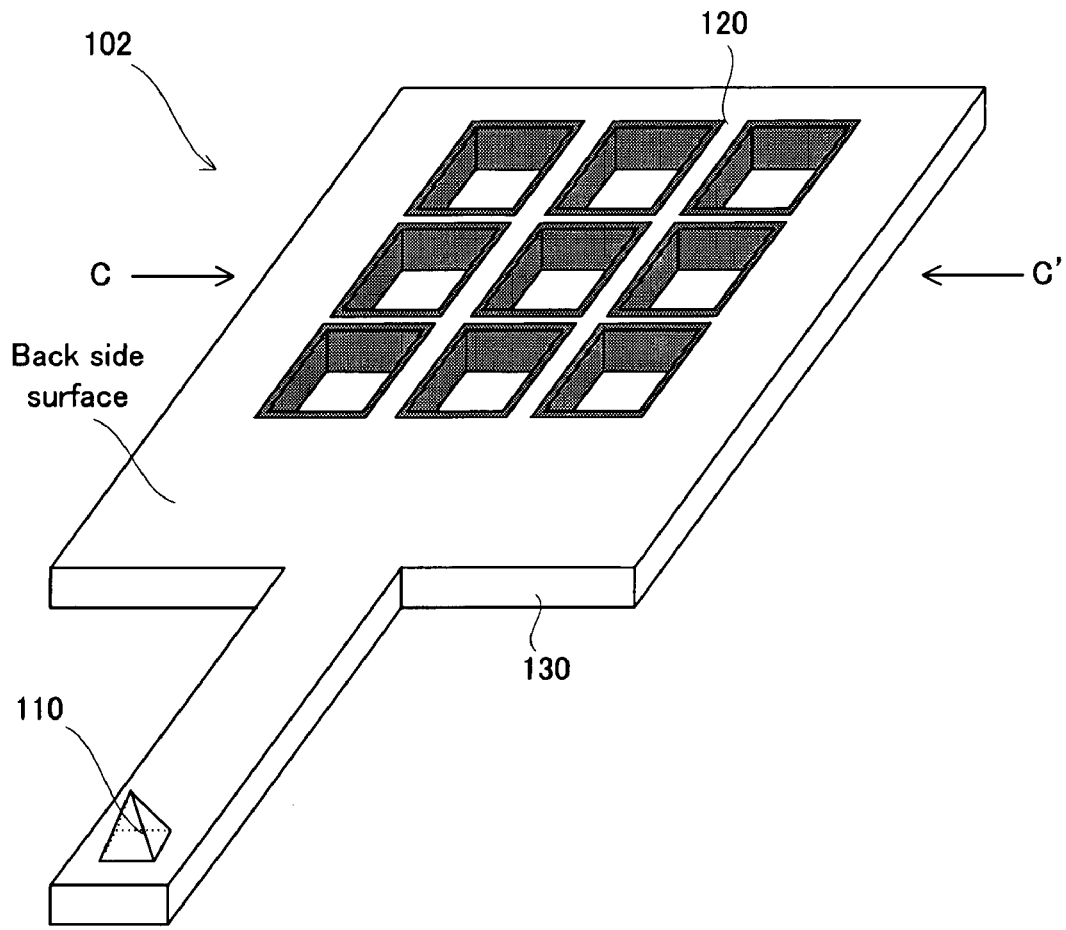
(a)
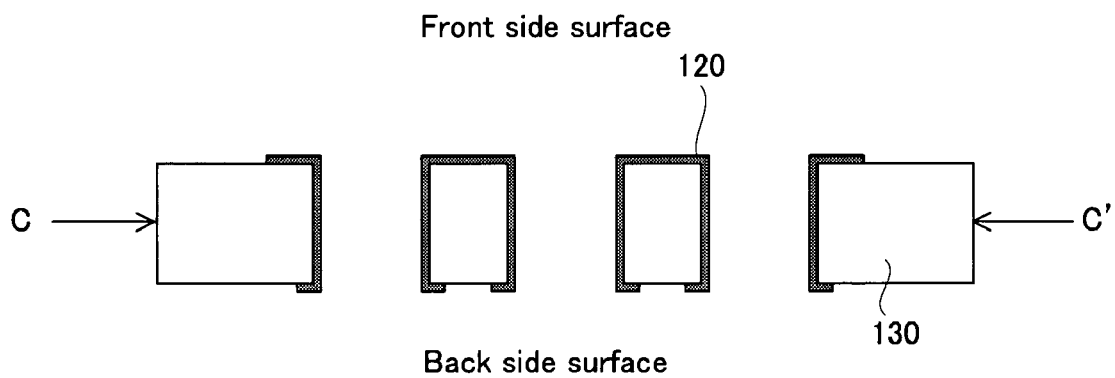
(b)

[FIG. 5]
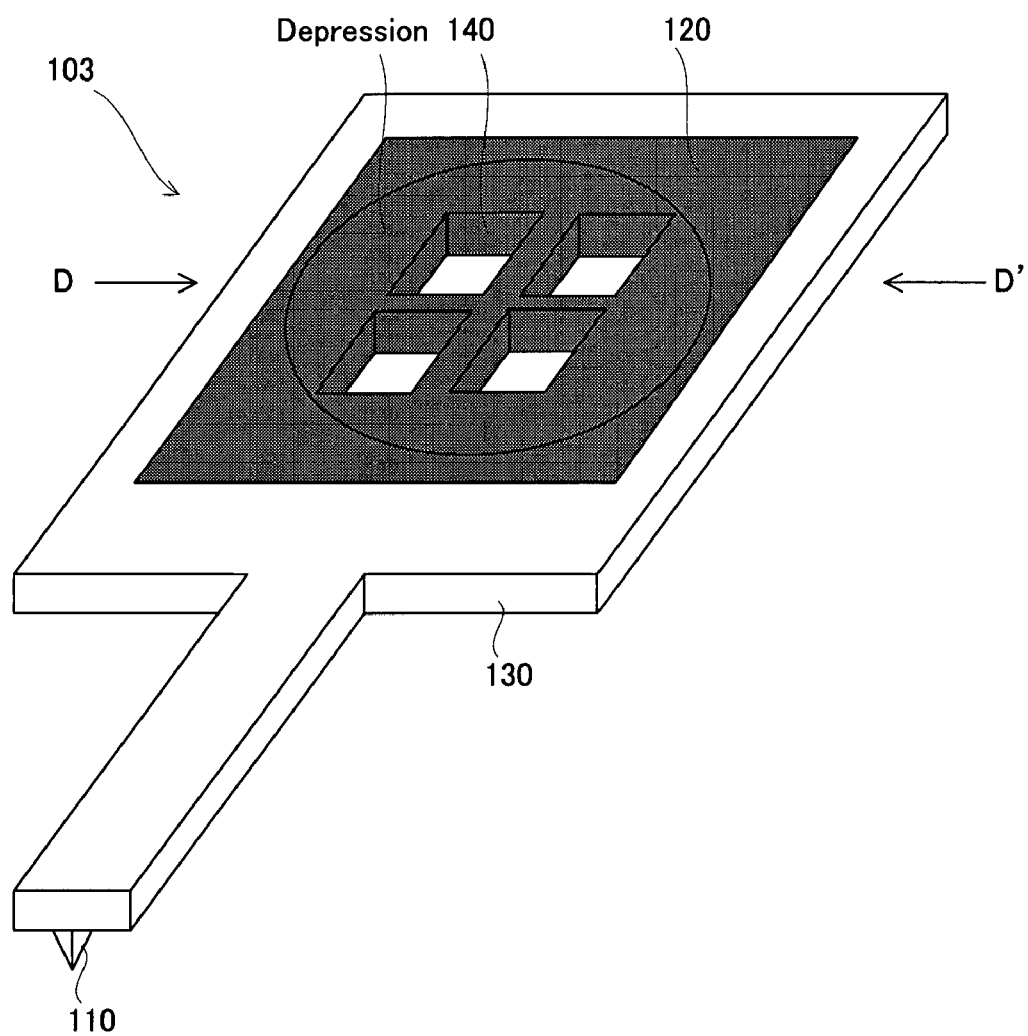
(a)
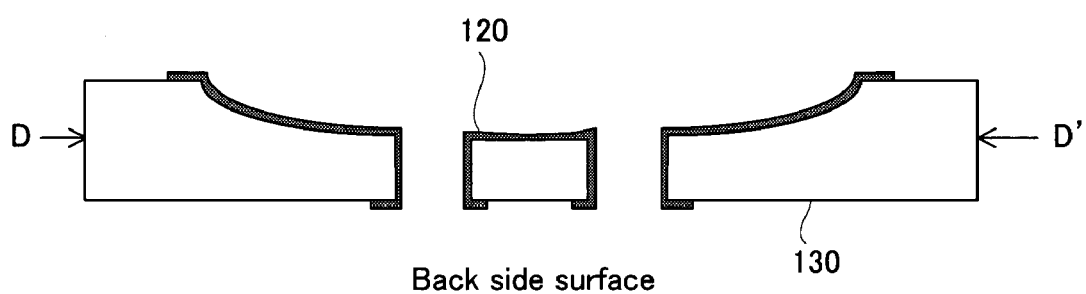
(b)

[FIG. 6]
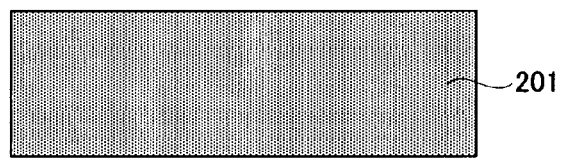
[FIG. 7]
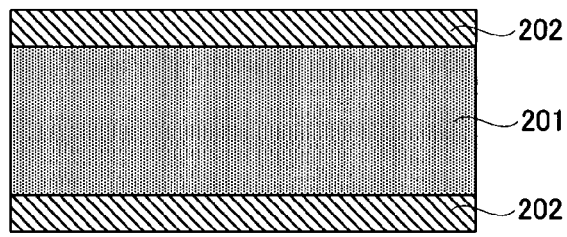
[FIG. 8]
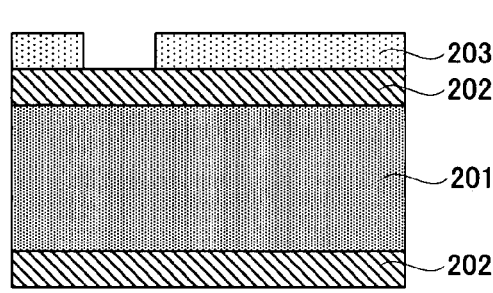 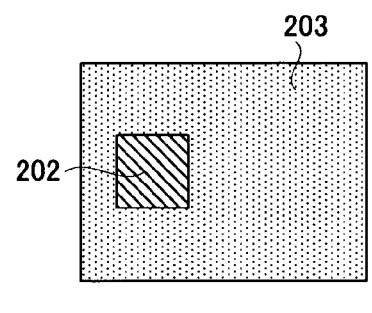
(a) (b)
[FIG. 9]
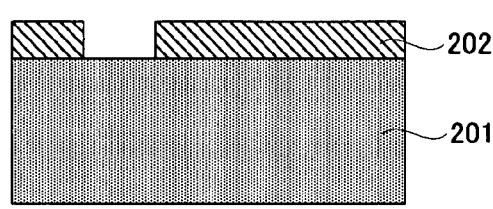 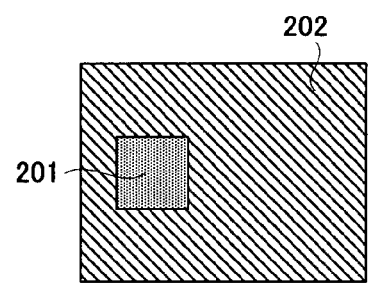
(a) (b)
[FIG. 10]
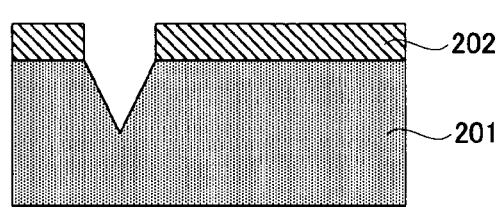 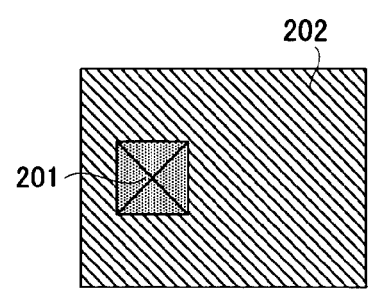
(a) (b)

[FIG. 11]
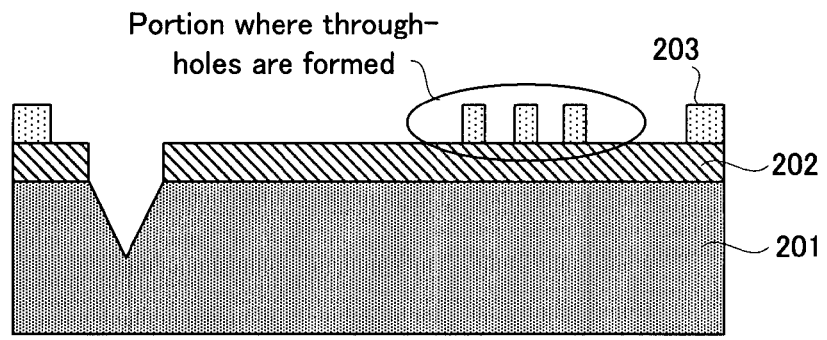
(a)
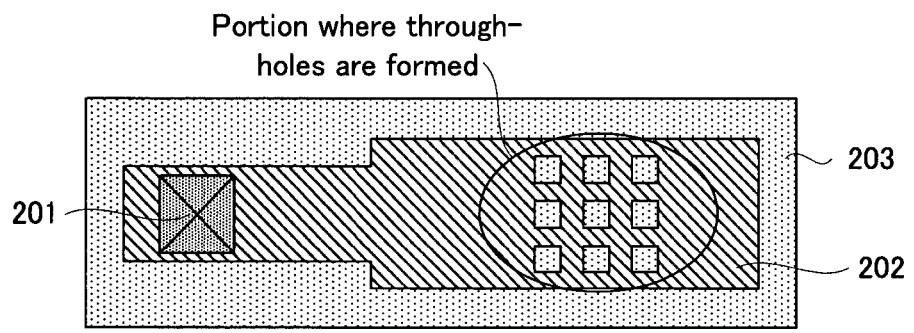
(b)
[FIG. 12]
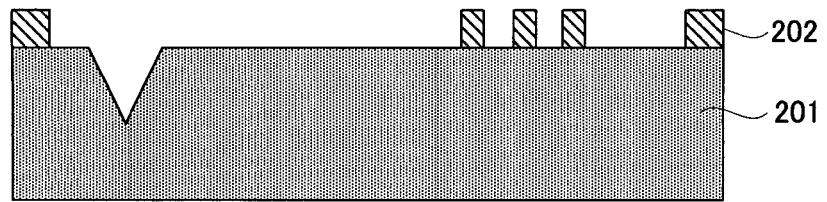
(a)
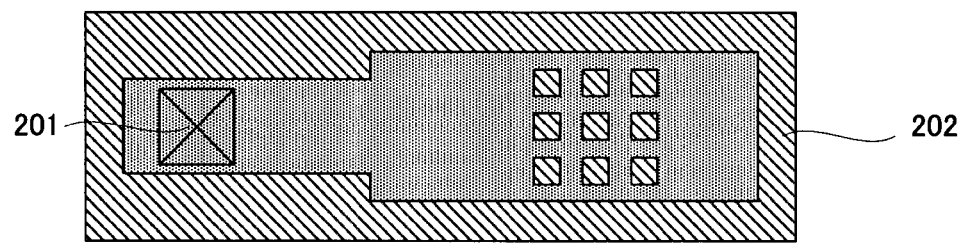
(b)

[FIG. 13]
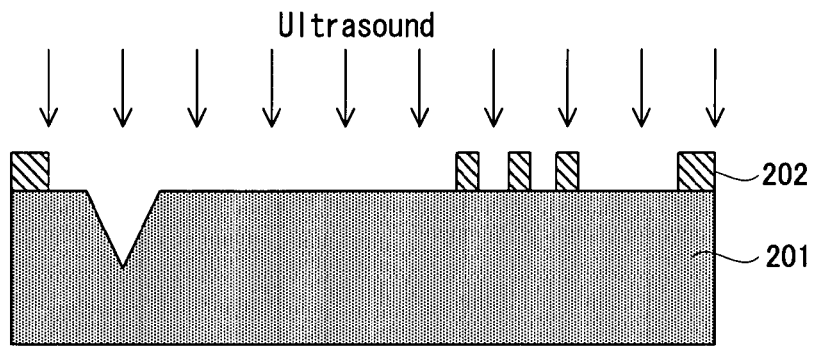
[FIG. 14]
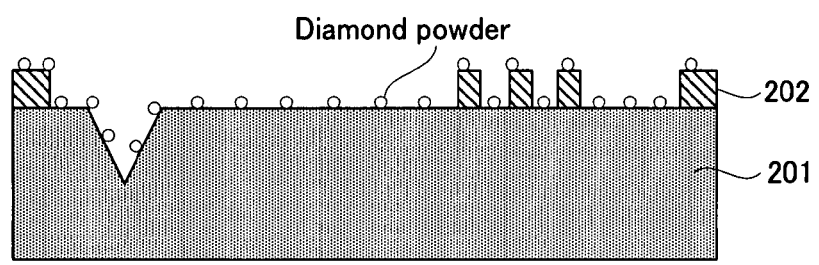
[FIG. 15]
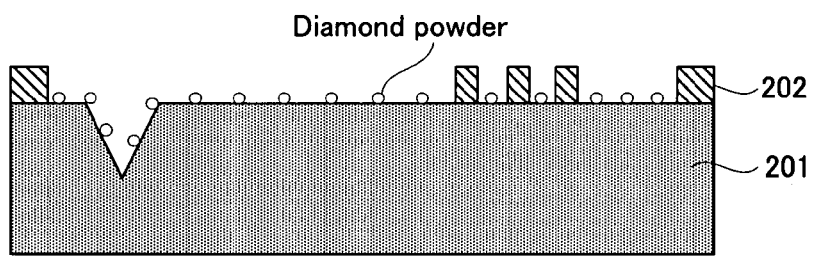
[FIG. 16]
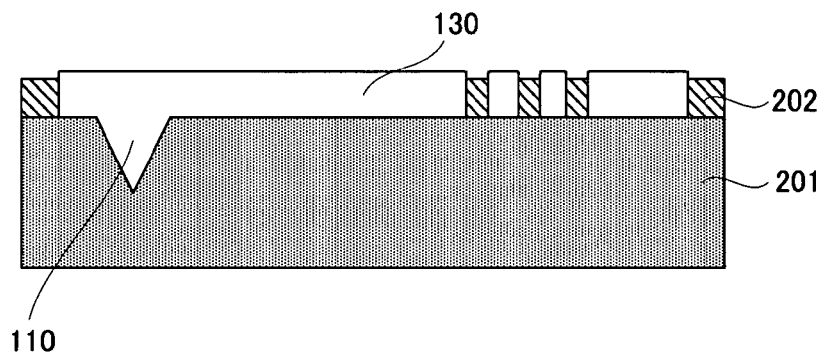

[FIG. 17]
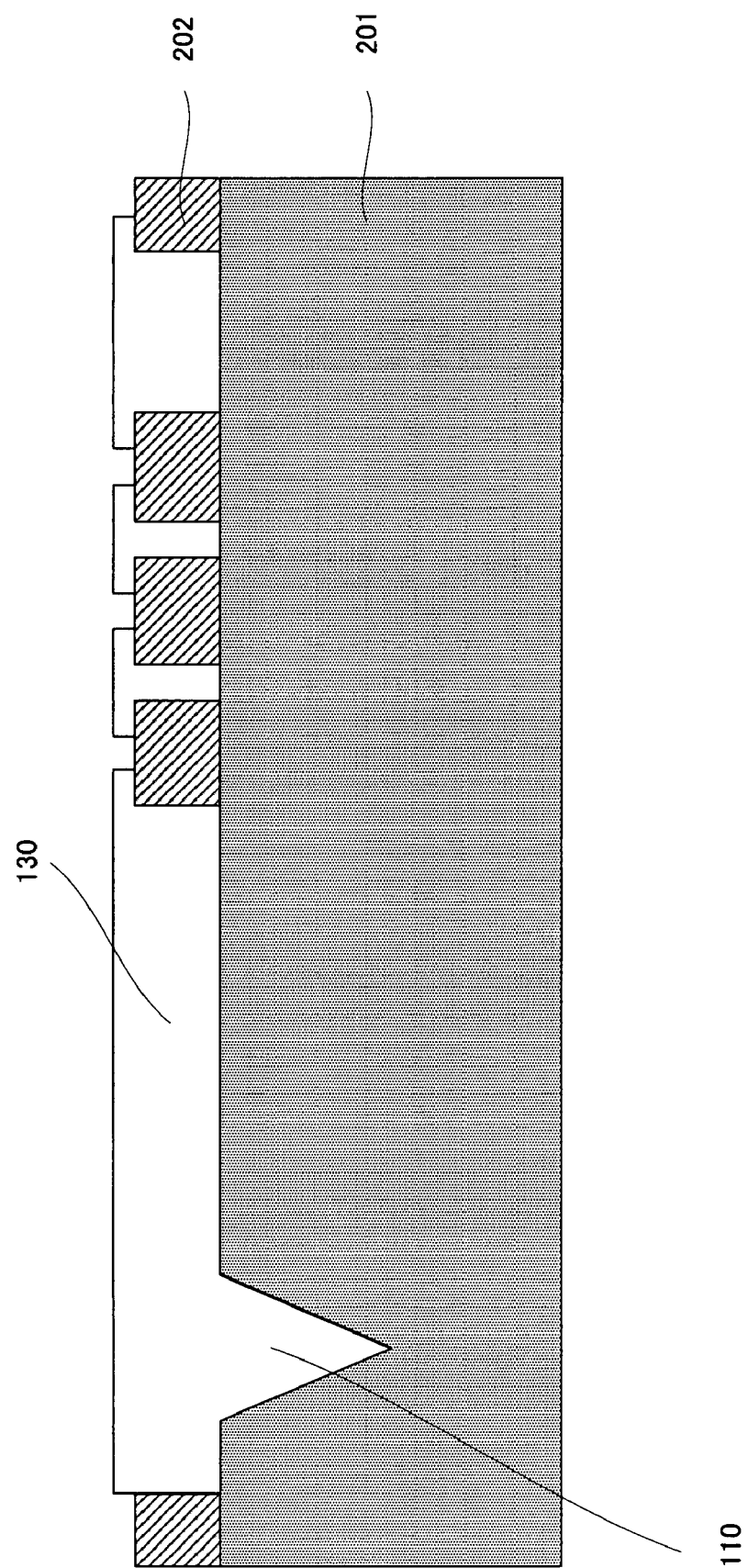

[FIG. 18]
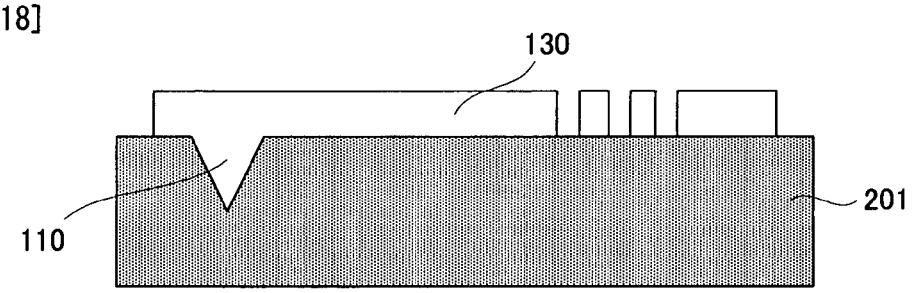
(a)
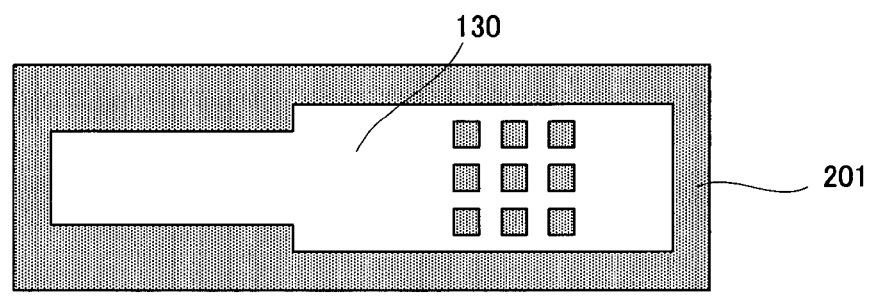
(b)
[FIG. 19]
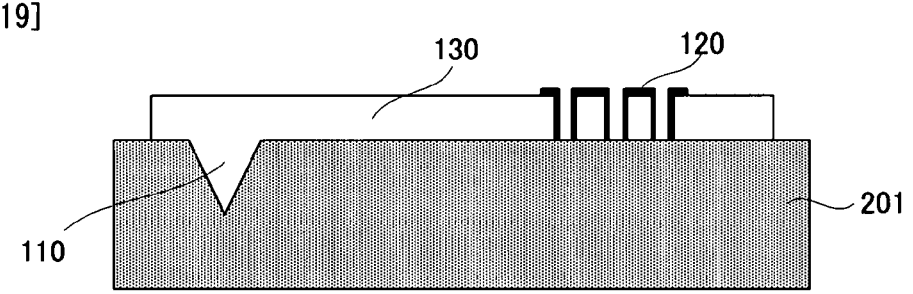
(a)
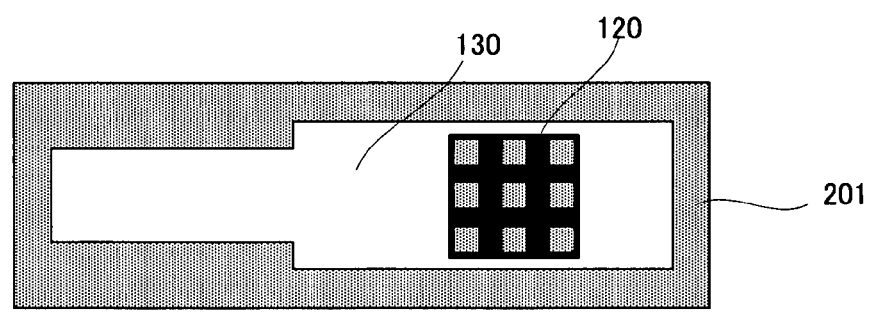
(b)

[FIG. 20]
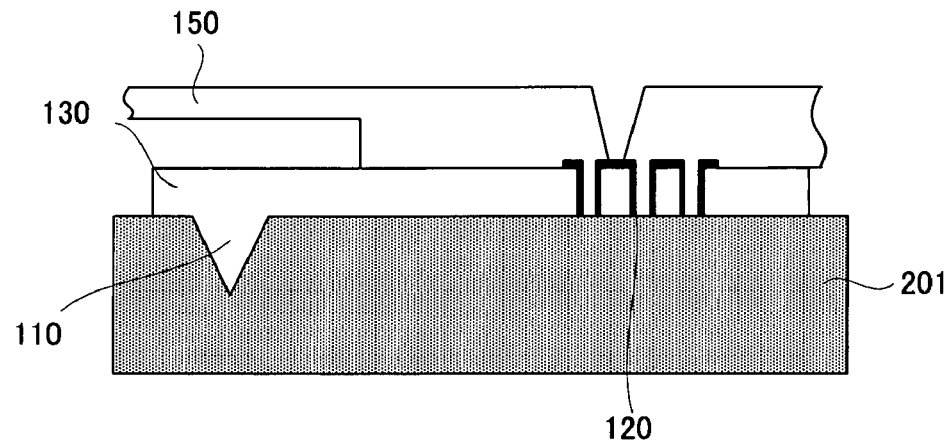
[FIG. 21]
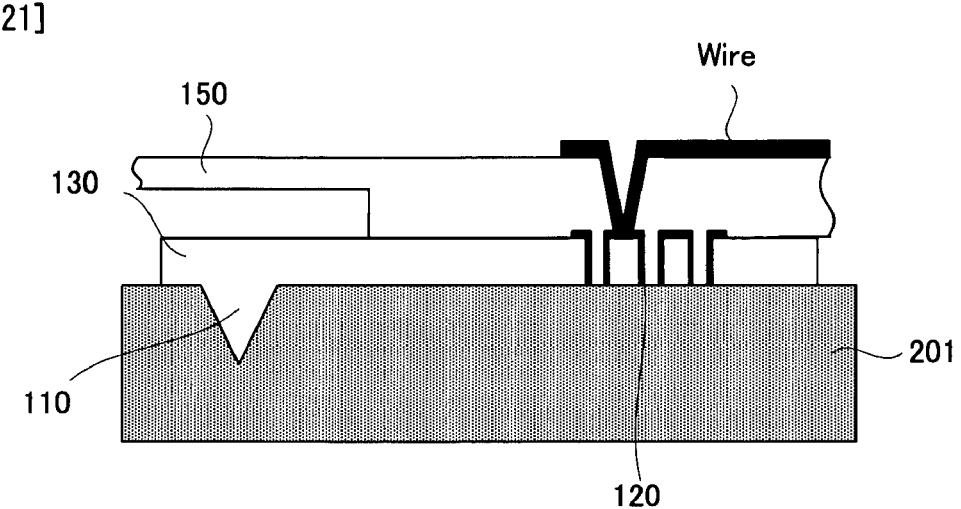
[FIG. 22]
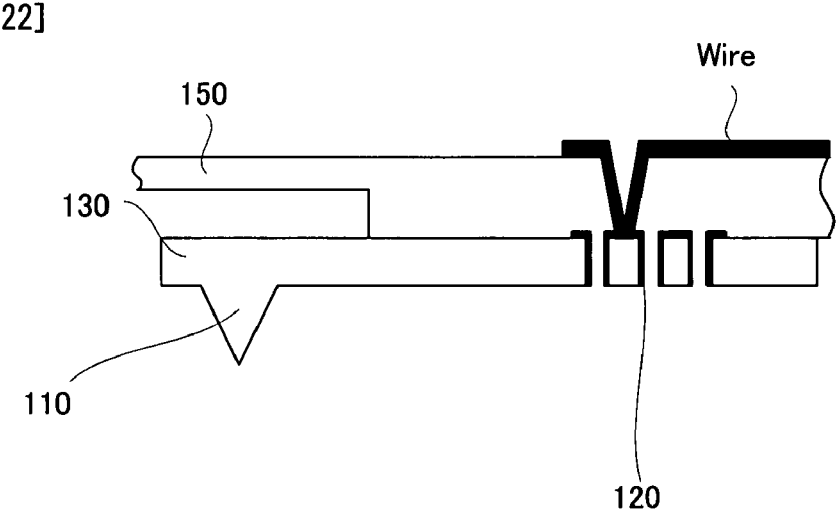

[FIG. 23]
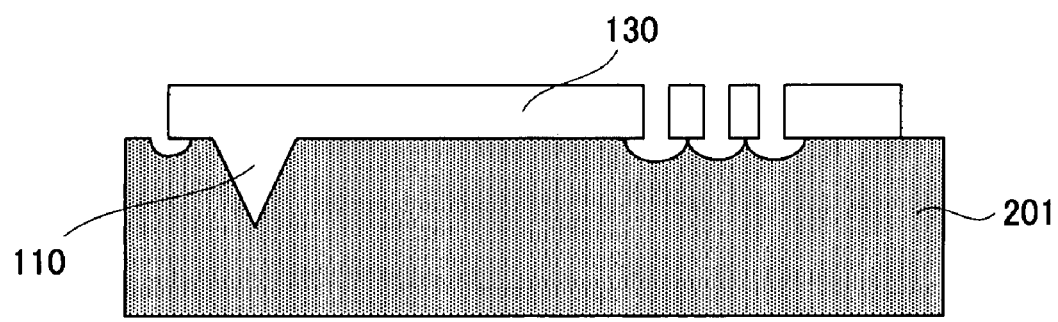
[FIG. 24]
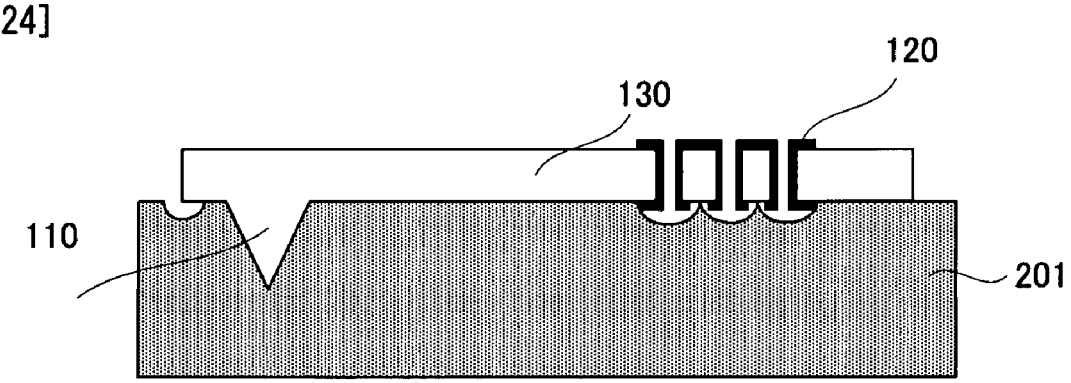

[FIG. 25]
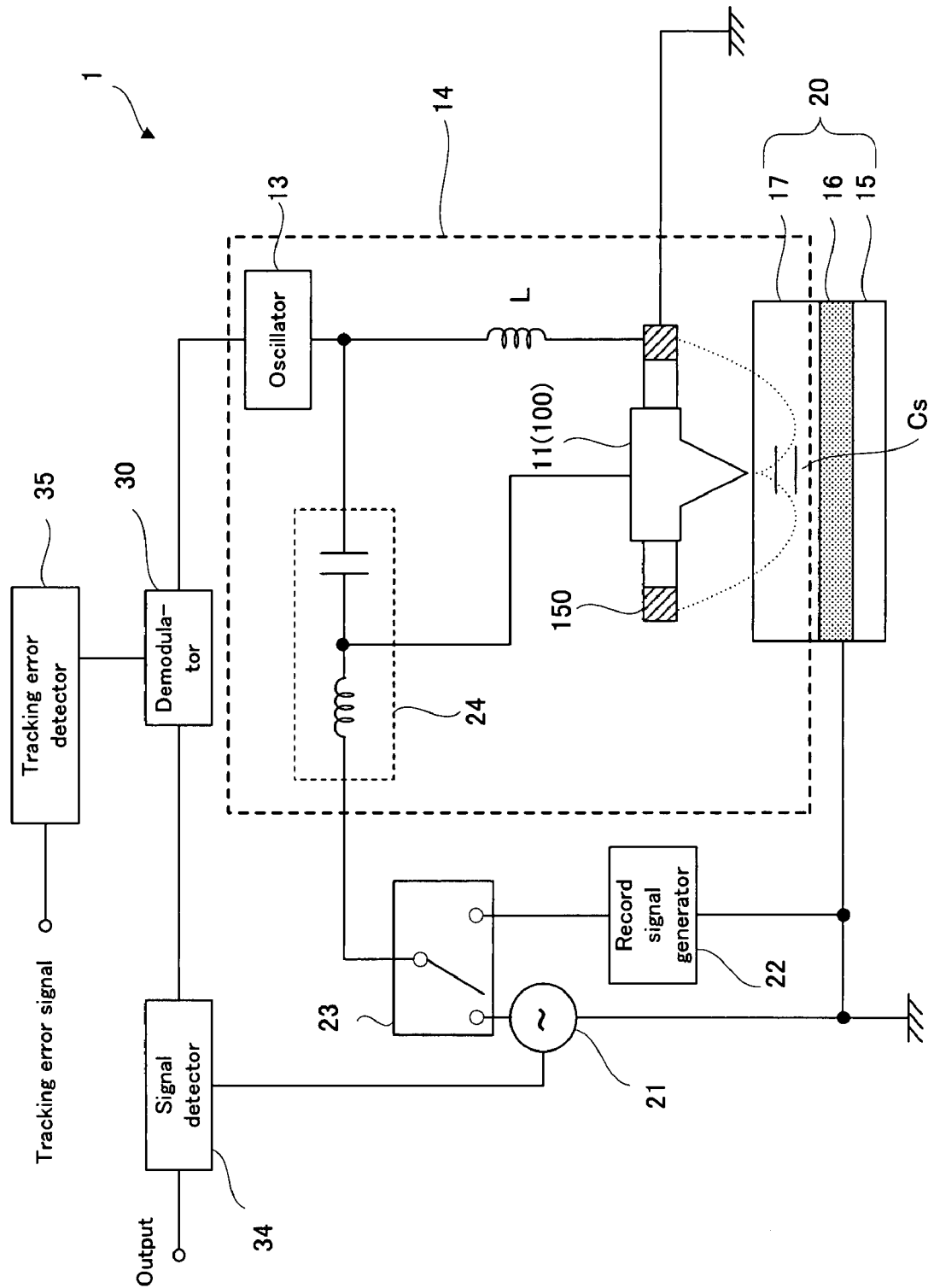

[FIG. 26]
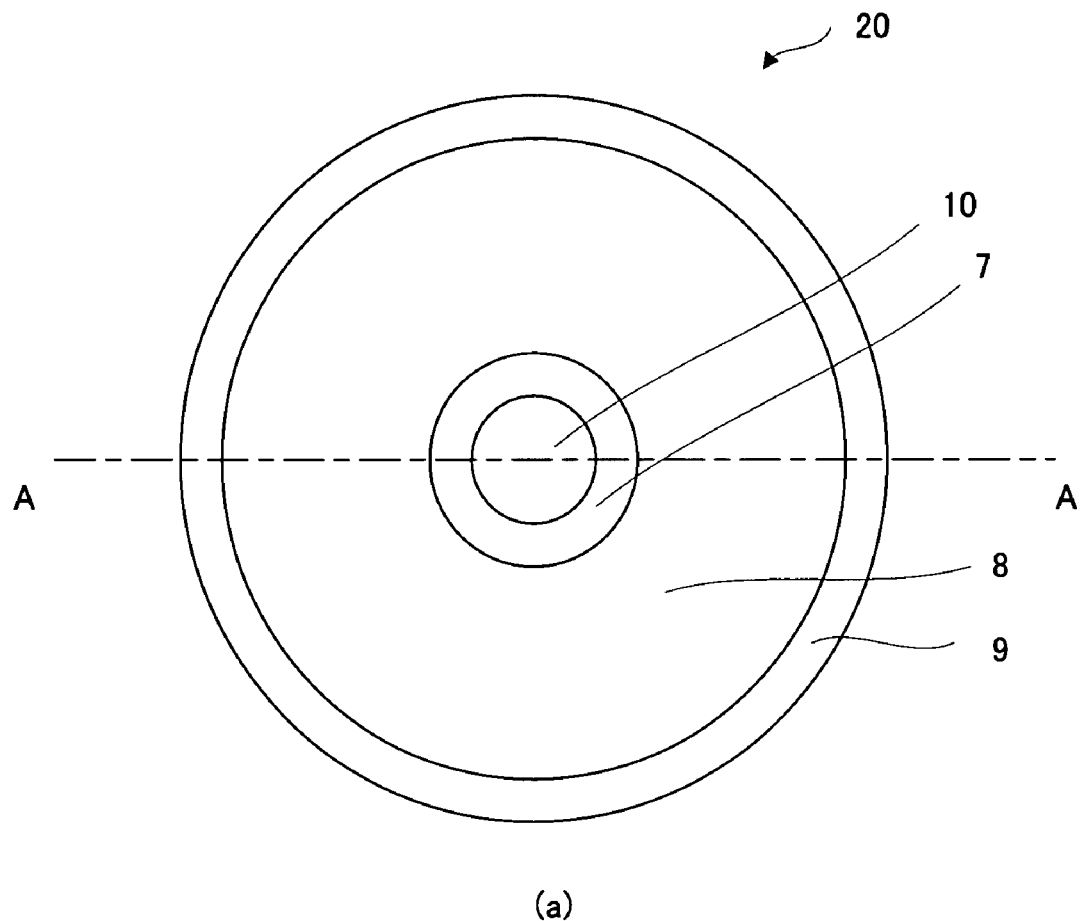
(a)
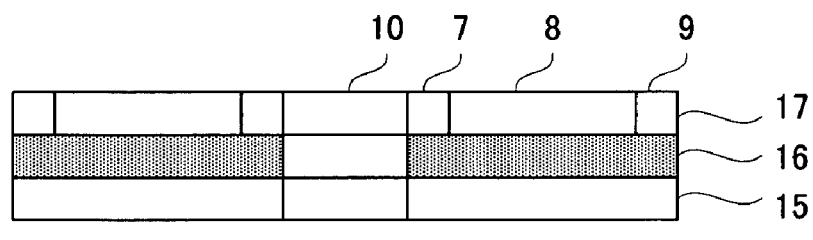
(b)

[FIG. 27]
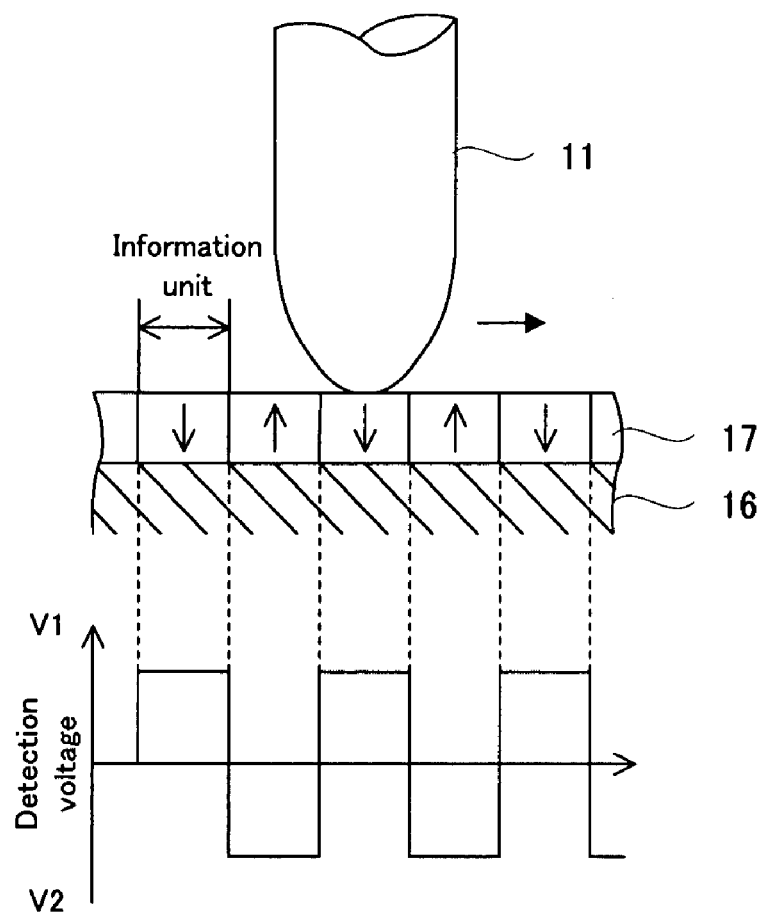
[FIG. 28]
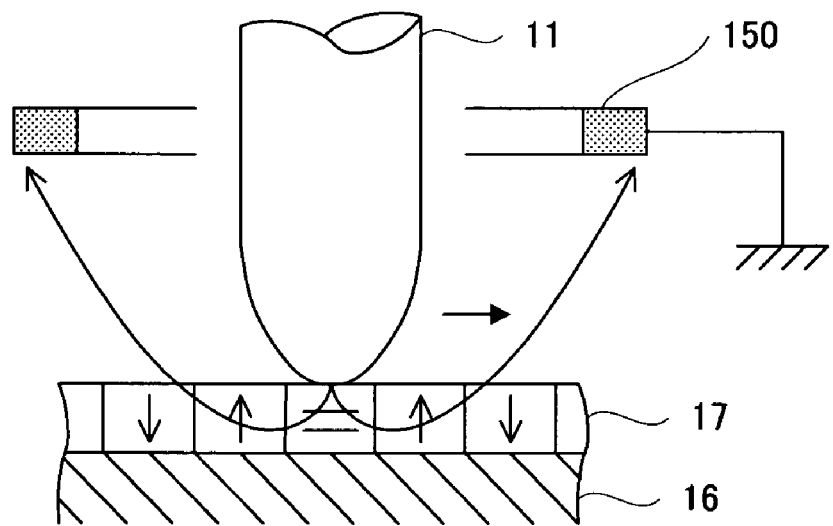

PROBE, MANUFACTURING METHOD OF THE PROBE, RECORDING APPARATUS, AND REPRODUCING APPARATUS

This application is the US national phase of international application PCT/JP2005/015576 filed 26 Aug. 2005 which designated the U.S. and claims benefit of JP 2004-248579 dated 27 Aug. 2004, the entire content of which is hereby incorporated by reference.

TECHNICAL FIELD

The present invention relates to a probe for recording and reproducing polarization information recorded in a dielectric substance, such as a ferroelectric recording medium, and a manufacturing method of the probe, and a recording apparatus and a reproducing apparatus which use the probe, for example.

BACKGROUND ART

The inventor of the present invention and others have proposed a technology of a recording/reproducing apparatus using SNDM (Scanning Nonlinear Dielectric Microscopy) for nanoscale analysis of a dielectric recording medium. In the SNDM, by using an electrically conductive cantilever (or probe) having a small projection on its tip, which is used for atomic force microscopy (AFM) or the like, the resolution of measurement can be increased to sub-nanometer. Recently, by applying the technology of SNDM, a super high-density recording/reproducing apparatus has been developed, wherein the apparatus records data into a recording medium having a recording layer made of a ferroelectric material (refer to a patent document 1).

On the recording/reproducing apparatus using such SNDM, the information is reproduced by detecting the positive/negative direction of polarization of the recording medium. This is performed by using the fact that the oscillation frequency of a LC oscillator, which includes a high-frequency feedback amplifier including a L component, the electrically conductive probe mounted on the amplifier, and the capacitance Cs of a ferroelectric material under the probe, is changed by a change $\Delta C$ in small capacitance, which is caused by the extent of a non-linear dielectric constant due to the distribution of the positive/negative polarization. Namely, this is performed by detecting a change in the distribution of the positive/negative polarization, as a change in oscillation frequency $\Delta f$.

Moreover, in order to detect the difference in the positive/negative polarization, an alternating electric field having sufficiently low frequency with respect to the oscillation frequency is applied to the oscillation frequency, to thereby change the oscillation frequency with the alternating electric field. At the same time, a ratio of the change in the oscillation frequency, including a code or sign, is determined from the non-linear dielectric constant of the ferroelectric material under the probe. Moreover, by extracting a component caused by the alternating electric field by using the FM (Frequency Modulation)-demodulating, from a high-frequency signal of the LC oscillator, which is FM-modulated in accordance with the change $\Delta C$ in the small capacitance associated with the application of the alternating electric field, the record information recorded in the ferroelectric recording medium is reproduced.

Patent document 1: Japanese Patent Application Laying Open NO. 2003-085969

DISCLOSURE OF INVENTION

Subject to be Solved by the Invention

As such a probe, diamond to which boron or the like is doped is preferably used. However, the diamond has a relatively large band gap, so that there is such a technical problem that good electrical contact is not provided between diamond and a conductive film (i.e. wire) for supplying an electric current to the probe. Specifically, there is such a technical problem that good ohmic contact cannot be achieved.

Such a situation could be a factor to increase an electrical resistance value between the conductive film and the diamond. Thus, even if the change in the oscillation frequency of the oscillator is detected in order to detect a change in positive/negative polarization of the ferroelectric material, the oscillation of the oscillator is attenuated because the electrical resistance value increases between the conductive film and the diamond. As a result, there is such a technical problem that the change in the oscillation frequency cannot be detected well.

In order to solve the above-mentioned problems, it is therefore an object of the present invention to provide a probe which has good electrical contact with a wire or conductive film, a manufacturing method of manufacturing the probe, and a recording apparatus and a reproducing apparatus which use the recording/reproducing head.

Means for Solving the Object (Probe)

The above object of the present invention can be achieved by a probe provided with: a support member having a through-hole in at least one portion thereof, a projective portion standing on the support member with its tip facing a medium; and a conductive film formed to cover at least a partial surface of the support member including a side surface of the through-hole.

According to the probe of the present invention, by applying a predetermined electric field from the projection connected to a power supply via the conductive film, it is possible to record information into a dielectric recording medium, which is one specific example of the medium, or reproduce the information recorded in the dielectric recording medium. At this time, an electric current for applying the electric field may be supplied to the projection, via the conductive film, with using the inside of the support member as its path (a route that the electric current flows). In this case, the support member preferably has electrical conductivity to a certain degree.

Particularly in the present invention, the through-hole is formed in at least one portion of the support member on which the projection stands and whose partial surface is covered with the conductive film. Moreover, the conductive film is formed so as to cover the through-hole (e.g. to cover the side surface or the like of the through-hole). If the through-hole is not formed, the conductive film only covers the surface of the support member. However, according to the recording/reproducing head of the present invention, the conductive film can be formed so as to cover the surface of the support member including the side surface of the through-hole. Therefore, the area at which the conductive film and the support member are in contact (i.e. the contact area between the conductive film and the support member) can be relatively increased. By this, it is possible to reduce an electrical resistance value on the interface between the conductive film and the support member, resulting in the achievement of good electrical contact (specifically good ohmic contact) between the conductive film and the support member.

Moreover, by using the probe of the present invention for a reproducing apparatus described later, for example, the oscillation of an oscillation circuit described later is not attenuated at all or hardly attenuated. By this, the reproducing apparatus can perform a stable reproduction operation. Moreover, even if the recording/reproducing head of the present invention is used for a recording apparatus described later, the recording apparatus can perform a stable recording operation because the good electrical contact can be obtained between the conductive film and the support member.

In particular, it is also considered that the contact area between the conductive film and the support member can be increased simply by damaging (e.g. slightly unleveling) the surface of the support member. However, according to the present invention, the through-hole is formed, and the conductive film is formed so as to cover the side surface thereof, so that there is such a great advantage that the contact area between the conductive film and the support member can be increased, greatly or more efficiently, as compared to the aspect that the surface of the support member is simply damaged.

Consequently, according to the probe of the present invention, it provides good electrical contact with the conductive film (or wire). By this, it is possible to reduce the electrical resistance value on the interface between the conductive film and the support member, and realize the stable reproduction operation and the like, as described later.

Moreover, the support member and the projection may be shaped such that the both are unified. Namely, even if the support member and the projection may be formed of a single member, it is also included in the scope of the present invention if the support member and the projection can be distinguished from a difference in shape.

In one aspect of the probe of the present invention, a plurality of through-holes are formed.

According to this aspect, as the number of the through-holes becomes larger, the contact area between the conductive film and the support member can be further increased.

In another aspect of the probe of the present invention, the support member has a depression portion including the through-hole in at least one portion thereof, and the conductive film is formed to cover at least a partial surface of the depression portion.

According to this aspect, the conductive film is formed in the depression portion in addition to the through-hole, so that the contact area between the conductive film and the support member can be increased, more effectively.

In an aspect of the probe having the depression portion, as described above, a plurality of depression portions are formed.

By virtue of such construction, as the number of the depression portions becomes larger, the contact area between the conductive film and the support member can be increased, more effectively.

In another aspect of the probe of the present invention, an area of the side surface of the through-hole is greater than an area of a cross section of the through-hole (particularly, a cross section on the plane including the surface of the support member).

According to this aspect, the contact area between the conductive film and the support member can be increased, effectively, as compared to a case where the through-hole is not formed.

In another aspect of the probe of the present invention, the support member is relatively thick.

According to this aspect, the area of the side surface of the through-hole is relatively increased. Therefore, by forming the conductive film so as to cover the side surface or the like of the through-hole, the contact area between the conductive film and the support member can be further increased.

In another aspect of the probe of the present invention, a contact area between the conductive film and the support member is greater than that in a case where the through-hole is not formed.

According to this aspect, the electrical contact between the conductive film and the support member can be further improved, as compared to the case where the through-hole is not formed.

In another aspect of the probe of the present invention, the conductive film is formed to cover at least one surface of a front side surface and a back side surface of the support member in which the through-hole is formed, and to cover the side surface of the through-hole.

According to this aspect, by covering, at least partially, the front side surface and back side surface of the support member, and the side surface of the through-hole, the contact area between the conductive film and the support member can be increased, efficiently and relatively easily.

In another aspect of the probe of the present invention, the support member includes diamond.

By virtue of such construction, super hard and lubricant diamond can be used as the support member, so that the probe has stronger resistance to deterioration. Moreover, if the support member includes diamond to which impurities, such as, for example, boron, is doped, the resistance value as the probe can be kept low because the support member has electrical conductivity.

In an aspect of the probe in which the support member includes diamond, as described above, the support member is formed by selective growth of the diamond.

By virtue of such construction, without requiring a special process or the like (e.g. a process of physically or mechanically making the through-hole in the support member, or a similar process), or without requiring a machining process that is difficult to perform or the like, the support member having the through-hole in at least one portion thereof can be formed, relatively easily. Therefore, the probe of the present invention can be manufactured, relatively easily and inexpensively.

In another aspect of the probe of the present invention, it is provided with a foundation layer whose adherence is stronger than that of the conductive film, the conductive film being formed on the foundation layer.

According to this aspect, it is possible to further prevent the exfoliation of the conductive film, to thereby extend the usage life as the probe.

In another aspect of the probe of the present invention, the conductive film includes platinum.

According to this aspect, due to platinum having electrical conductivity, the resistance value of the conductive film can be kept low. Incidentally, as the conductive film, alloy, such as platinum palladium and platinum iridium, is preferably used.

(Manufacturing Method)

The above object of the present invention can be also achieved by manufacturing method for manufacturing the above-mentioned probe of the present invention (including its various aspects), the manufacturing method provided with: a first forming process of forming a mold, which is to form at least the support member and which has a predetermined physical shape for forming the through-hold in at least one portion of the support member; a second forming process of forming the support member by using the mold; and a third forming process of forming the conductive film on at least a partial surface of the support member including the side surface of the through-hole.

According to the manufacturing method of the present invention, it is possible to manufacture the probe of the present invention, relatively easily.

Specifically, firstly, in the first forming process, the mold for forming the support member is formed. In particular, the mold formed in the first forming process can form the support member having the through-hole in at least one portion thereof, using the predetermined physical shape (e.g. the shape of a silicon dioxide film formed on a silicon substrate, as described later). Here, the mold is formed by combining various processes, such as patterning by resist, etching, and a film forming method (or film growth method).

Then, by using the mold formed in the first forming process, the support member (more preferably, further the projection) is formed in the second forming process. Here, the support member and the like are formed by using the mold capable of forming the through-hole. As a result, the through-hole can be also formed while the support member is formed. Namely, without requiring a special process, or without requiring a difficult machining process, the support member having the through-hole in at least one portion thereof can be formed, relatively easily.

Then, in the third forming process, the conductive film is formed so as to cover at least the partial surface of the support member. In particular, at least the side surface of the through-hole is preferably covered with the conductive film. Here, for example, deposition and spattering can be used to form a conductive layer (i.e. the conductive film). Alternatively, another film forming method (e.g. CVD (Chemical Vapor Deposition), etc.) may be used to form the conductive film.

Consequently according to the manufacturing method of the present invention, it is possible to manufacture the above-mentioned probe of the present invention, relatively easily and inexpensively. Namely, the above-mentioned probe of the present invention can be manufactured by the manufacturing method excellent in mass-productivity.

In one aspect of the manufacturing method of the present invention, the predetermined physical shape is thicker than the support member.

According to this aspect, by using the mold having the physical shape thicker than the support member to be manufactured, it is possible to preferably form the support member having the through-hole, as described later. Namely, the through-hole can be preferably formed that is certainly cut through the support member from the front side to the back side.

In another aspect of the manufacturing method of the present invention, at least the support member includes diamond, and the second forming process forms the support member by selective formation of the diamond.

According to this aspect, during the selective growth process of the diamond, which is normally performed to form the support member, the through-hole can be formed, simultaneously or in parallel. Therefore, without requiring a special process, or without requiring a difficult machining process, the support member having the through-hole in at least one portion thereof can be formed, relatively easily.

In another aspect of the manufacturing method of the present invention, in the third process, isotropic etching is performed on at least one portion of the mold, and the conductive film is formed on an upper side surface of the support member.

According to this aspect, by performing the isotropic etching, for example, one portion of the mold (particularly, one portion of the mold located on the back side of the support member) can be bored after the support member is formed. By this, it is also possible to form the conductive film even on the back side of the support member where the formation of the conductive film could be normally prevented due to the mold.

(Recording Apparatus)

The above object of the present invention can be also achieved by a recording apparatus for recording data into a dielectric recording medium, the recording apparatus provided with: the above-mentioned probe of the present invention (including its various aspects); and a record signal generating device for generating a record signal corresponding to the data.

According to the recording apparatus of the present invention, while taking advantage of the above-mentioned probe of the present invention, data can be recorded on the basis of the record signal generated by the record signal generating device.

(Reproducing Apparatus)

The above object of the present invention can be also achieved by a reproducing apparatus for reproducing data recorded in a dielectric recording medium, the reproducing apparatus provided with: the above-mentioned probe of the present invention (including its various aspects); an electric field applying device for applying an electric field to the dielectric recording medium; an oscillating device whose oscillation frequency varies depending on a difference in capacitance corresponding to a nonlinear dielectric constant of the dielectric recording medium; and a reproducing device for demodulating an oscillation signal generated by the oscillating device and reproducing the data.

According to the reproducing apparatus of the present invention, the electric field is applied by the electric field applying device to the dielectric recording medium. By this, the capacitance is changed depending on a change in the nonlinear dielectric constant of the dielectric recording medium. Due to the capacitance change, the oscillation frequency of the oscillating device is changed. Then, the oscillation signal corresponding to the change in the oscillation frequency by the oscillating device is demodulated and reproduced by the reproducing device, to thereby reproduce the data.

Particularly in the present invention, the data can be reproduced with taking advantage of the probe of the present invention described above. Namely, since the resistance value of the recording/reproducing head is small, it is possible to avoid such a disadvantage that an oscillation signal from the oscillating device is attenuated. Therefore, the data can be reproduced, more stably.

(Recording/Reproducing Apparatus)

The above object of the present invention can be also achieved by a recording/reproducing apparatus for recording data into a dielectric recording medium and reproducing the data recorded in the dielectric recording medium, the recording/reproducing apparatus provided with: the above-mentioned probe of the present invention (including its various aspects); a record signal generating device for generating a record signal corresponding to the data; an electric field applying device for applying an electric field to the dielectric recording medium; an oscillating device whose oscillation frequency varies depending on a difference in capacitance corresponding to a nonlinear dielectric constant of the dielectric recording medium; and a reproducing device for demodulating an oscillation signal generated by the oscillating device and reproducing the data.

According to the recording/reproducing apparatus of the present invention, as in the above-mentioned recording apparatus or reproducing apparatus, the data can be recorded or reproduced with taking advantage of the probe of the present invention described above.

Incidentally, in response to the first, second, third, or fourth probe of the present invention described above, the recording/reproducing device of the present invention can adopt various aspects.

These effects and other advantages of the present invention will become more apparent from the following embodiments.

As explained above, according to the recording/reproducing head of the present invention, it is provided with the support member, the projection, and the conductive film. Therefore, good electrical contact can be provided between the conductive film and the support member.

Moreover, according to the manufacturing method of the present invention, it is provided with the first forming process, the second forming process, and the third forming process. Therefore, it is possible to manufacture the above-mentioned recording/reproducing head of the present invention, relatively easily and efficiently.

Moreover, according to the recording apparatus of the present invention, it is provided with the recording/reproducing head of the present invention and the record signal generating device. Therefore, it is possible to receive the various benefits of the recording/reproducing head of the present invention. As a result, it is possible to record the data more stably.

Moreover, according to the reproducing apparatus of the present invention, it is provided with the recording/reproducing head of the present invention, the electric field applying device, the oscillating device, and the reproducing device. Therefore, it is possible to receive the various benefits of the recording/reproducing head of the present invention. As a result, it is possible to reproduce the data more stably.

BRIEF DESCRIPTION OF DRAWINGS

FIG. 1 are a perspective view and a cross sectional view conceptually showing an embodiment of a recording/reproducing head.

FIG. 2 is a perspective view showing in more detail a through-hole owned by the embodiment of the recording/reproducing head.

FIG. 3 are a perspective view and a cross sectional view conceptually showing a first modified example of the embodiment of the recording/reproducing head.

FIG. 4 are a perspective view and a cross sectional view conceptually showing a second modified example of the embodiment of the recording/reproducing head.

FIG. 5 are a perspective view and a cross sectional view conceptually showing a third modified example of the embodiment of the recording/reproducing head.

FIG. 6 is a cross sectional view and a plan view conceptually showing one process of the manufacturing method of the embodiment of the recording/reproducing head.

FIG. 7 is a cross sectional view and a plan view conceptually showing another process of the manufacturing method of the embodiment of the recording/reproducing head.

FIG. 8 are a cross sectional view and a plan view conceptually showing another process of the manufacturing method of the embodiment of the recording/reproducing head.

FIG. 9 are a cross sectional view and a plan view conceptually showing another process of the manufacturing method of the embodiment of the recording/reproducing head.

FIG. 10 are a cross sectional view conceptually showing another process of the manufacturing method of the embodiment of the recording/reproducing head.

FIG. 11 are a cross sectional view conceptually showing another process of the manufacturing method of the embodiment of the recording/reproducing head.

FIG. 12 are a cross sectional view conceptually showing another process of the manufacturing method of the embodiment of the recording/reproducing head.

FIG. 13 is a cross sectional view conceptually showing another process of the manufacturing method of the embodiment of the recording/reproducing head.

FIG. 14 is a cross sectional view conceptually showing another process of the manufacturing method of the embodiment of the recording/reproducing head.

FIG. 15 is a cross sectional view and a plan view conceptually showing another process of the manufacturing method of the embodiment of the recording/reproducing head.

FIG. 16 is a cross sectional view and a plan view conceptually showing another process of the manufacturing method of the embodiment of the recording/reproducing head.

FIG. 17 is a cross sectional view conceptually showing another process of the manufacturing method of the embodiment of the recording/reproducing head.

FIG. 18 are a cross sectional view conceptually showing another process of the manufacturing method of the embodiment of the recording/reproducing head.

FIG. 19 are a cross sectional view conceptually showing another process of the manufacturing method of the embodiment of the recording/reproducing head.

FIG. 20 is a cross sectional view conceptually showing another process of the manufacturing method of the embodiment of the recording/reproducing head.

FIG. 21 is a cross sectional view conceptually showing another process of the manufacturing method of the embodiment of the recording/reproducing head.

FIG. 22 is a cross sectional view conceptually showing another process of the manufacturing method of the embodiment of the recording/reproducing head.

FIG. 23 is a cross sectional view conceptually showing another process of the manufacturing method of the embodiment of the recording/reproducing head.

FIG. 24 is a cross sectional view conceptually showing another process of the manufacturing method of the embodiment of the recording/reproducing head.

FIG. 25 is a block diagram conceptually showing the basic structure of an embodiment of a dielectric recording/reproducing apparatus which employs the embodiment of the recording/reproducing head.

FIG. 26 are a plan view and a cross sectional view conceptually showing a dielectric recording medium used for the reproduction of the dielectric recording/reproducing apparatus in the embodiment.

FIG. 27 is a cross sectional view conceptually showing the recording operation of the dielectric recording/reproducing apparatus in the embodiment.

FIG. 28 is a cross sectional view conceptually showing the reproduction operation of the dielectric recording/reproducing apparatus in the embodiment.

DESCRIPTION OF REFERENCE CODES 1 dielectric recording/reproducing apparatus
11 probe
12 return electrode
13 oscillator
14 resonance circuit
16 electrode
17 dielectric material
20 dielectric recording medium
21 alternating current signal generator
22 record signal generator
100, 101, 102, 103 recording/reproducing head
110 diamond tip
120 conductive film
130 support member
140 through-hole
201 silicon substrate
202 silicon dioxide film
203 photoresist

BEST MODE FOR CARRYING OUT THE INVENTION

Hereinafter, the best mode for carrying out the present invention will be explained for each embodiment in order with reference to the drawings.

Hereinafter, an embodiment of the probe of the present invention will be explained with reference to the drawings. Incidentally, in the embodiment below, as one specific example of the probe of the present invention, an explanation will be given for a recording/reproducing head (further, a recording/reproducing head array) for recording data into a dielectric recording medium or for reproducing the data recorded in the dielectric recording medium. Of course, it will be obvious that the probe can be used in various equipment using the probe (cantilever), such as, for example, AFM.

(1) Embodiment of Recording/Reproducing Head

Firstly, with reference to FIG. 1 to FIG. 24, the embodiment of the recording/reproducing head of the present invention will be explained.

(i) Structure of Recording/Reproducing Head

Firstly, with reference to FIG. 1 and FIG. 2, the structure (i.e. basic structure) of the recording/reproducing head in the embodiment will be explained. FIG. 1 are a perspective view and a cross sectional view conceptually showing one example of the structure of a recording/reproducing head in the embodiment. FIG. 2 is a perspective view showing in more detail a through-hole owned by the recording/reproducing head in the embodiment.

As shown in FIG. 1(a), a recording/reproducing head 100 in the embodiment is provided with: a diamond tip 110, which is one specific example of the "projection" of the present invention; a conductive film 120; a support member 130; and a plurality of through-holes 140.

The diamond tip 110 has a sharp-pointed tip so as to apply an electric field to a dielectric recording medium 20 (refer to FIG. 26) described later from the tip side, at the time of recording/reproduction of the recording/reproducing head 100. The diamond tip 110 is provided with electrical conductivity particularly by doping boron or the like to diamond in the manufacturing thereof.

Incidentally, instead of the diamond tip 110, for example, boron nitride can be used as well. Alternatively, any member which is relatively hard and which has electrical conductivity can be used instead of the diamond tip 110.

The conductive film 120 is formed to cover at least one portion of the surface of the support material 130, in order to supply to the diamond tip 110 an electric current necessary to apply an electric field from the diamond tip 110 to a dielectric recording medium described later. Specifically, the electric current supplied from a power source is supplied to the diamond tip 110, passing through the inside of the support member 130 via the conductive film 120 (i.e. with using the inside of the support member 130 as a path). Of course, even if the inside of the support member 130 is not used as the path of the electric current, the conductive film 120 and the diamond tip 110 may be directly connected.

Particularly in the embodiment, the conductive film 120 is formed to cover the surfaces (i.e. side surfaces, for example) of the through-holes 140 formed in at least a partial area of the support member 130. The conductive film 120 can employ alloy, such as, for example, platinum palladium and platinum iridium. Alternatively, as described later, it may employ aluminum, chromium, gold, or alloy of these metal or the like.

The support member 130 is a basis for supporting the recording/reproducing head 100. The support member 130 preferably has electrical conductivity because it is used as the path thorough which the electric current passes, as described above. However, if the conductive film 120 and the diamond tip 110 are directly connected, the support member 130 does not have to be the path of the electric current, so that it does not have to have electrical conductivity. Moreover, as described later, the support member 130 and the diamond tip 110 may be unified (refer to FIG. 6, etc.).

The support member 130, as in the diamond tip 110, is formed of diamond to which boron or the like is doped. In addition, if the diamond is used to form the support member 130, the adherence to the diamond tip 110 can be increased. However, it is not limited to the diamond, and, for example, silicon or other materials (e.g. carbonaceous materials) may be used to form the support member 130.

Moreover, as described later, the support member 130 constitutes one portion of a resonance circuit 14 at the time of reproduction, as one portion of a probe 11 (refer to FIG. 25). Thus, in order to obtain a desired resonance frequency, the material is more preferably selected depending on the inductance of the support member 130. Moreover, as the material is selected in this manner, the vibrational frequency of the probe 11 can be also changed, as occasion demands.

The through-hole 140 is a hole cut through the support member 130 from the front side to the back side, and is disposed in at least a partial area of the support member 130. Then, the surface of the through-hole 140 (specifically, the side surface of the through-hole 140, etc.) is covered with the conductive film 120.

This will be explained more specifically, using FIG. 1(b) which is an A-A' cross sectional view of the recording/reproducing head 100 shown in FIG. 1(a). As shown in FIG. 1(b), the side surfaces of the through-holes 140 are covered with the conductive film 120. Also, out of the front side surface of the support member 130 (specifically, the surface on the side where the diamond tip 110 is not formed, of the support member 130), the surrounding portion of the through-holes 140 is covered with the conductive film 120.

At this time, if the through-holes 140 are not formed, the conductive film 120 is originally formed to contact only with the front side surface of the support member 130. On the other hand, if the through-holes 140 are formed, the conductive film 120 is formed to contact not only the front side surface of the support member 130 but also the side surfaces of the through-holes 140. Therefore, even if the contact area is reduced only by the cross sections of the through-holes 140, if the area of the side surfaces of the through-holes 140 are greater than the area of the cross sections of the through-holes 140, then, the contact area between the conductive film 120 and the support member 130 increases.

The increase of the contact area will be explained more specifically, using numerical values, with reference to FIG. 2. Here, it is assumed that the through-hole 140 has a rectangular cross section, and that the lengths of the sides are "a" and "b". Moreover, it is assumed that the thickness of the support member 130 is "t". At this time, an area S1 of the side surface of the through-hole 140 is expressed by S1=a×t×2+b×t×2. On the other hand, a cross section S2 of the through-hole 140 is expressed by S2=a×b. Therefore, by the forming of the through-hole 140, the contact area between the conductive film 120 and the support member 130 is increased by S1−S2 per one through-hole 140. Namely, the contact area is increased by S1−S2=2t(a+b)−ab. More specifically, if "a=10 μm", "b=15 μm", and "t=10 μm", by the forming of the through-hole 140, the contact area between the conductive film 120 and the support member 130 is increased by 2×10× (10+15)−10×15=350 μm².

The increase of the contact area between the conductive film 120 and the support member 130 allows a reduction of resistance on the interface between the conductive film 120 and the support member 130. This means that the electric current can easily flow from the conductive film 120 to the support member 130. In other words, good ohmic contact can be achieved between the conductive film 120 and the support member 130. Therefore, without wasting the electric current supplied from the power source, the electric current can be preferably supplied to the diamond tip 110 via the conductive film 120.

Moreover, if the recording/reproducing head 100 in the embodiment is used as the probe on a dielectric recording/reproducing apparatus descried later, the contact portion between the conductive film 120 and the support member 130 is incorporated in an oscillation circuit described later. Then, since good ohmic contact can be achieved on the interface between the conductive film 120 and the support member 130, there is such an advantage that the oscillation of the oscillation circuit is not attenuated at all or hardly attenuated. Namely, the oscillation of the oscillation circuit can be stabilized. This leads to the stable reproduction operation of the dielectric recording/reproducing apparatus.

In addition, as in the recording/reproducing head 100 in the embodiment, if the contact area between the conductive film 120 and the support member 130 is increased by forming the through-hole 140, the recording/reproducing head 100 can be relatively easily manufactured by effectively using the selective growth of diamond, as described later. Incidentally, this advantage will be explained in detail in the embodiment of the manufacturing method described later.

Moreover, a plurality of through-holes 140 are preferably provided. Moreover, in order to further increase the contact area between the conductive film 120 and the support member 130, preferably, the cross section of the through-hole 140 is relatively small or smaller. In addition, the thickness of the support member 130 is relatively thick or thicker, preferably. By this, the contact area between the conductive film 120 and the support member 130 can be further increased, resulting in a further reduction in resistance on the interface between the conductive film 120 and the support member 130.

(ii) Modified Examples of Recording/Reproducing Head

Next, with reference to FIG. 3 to FIG. 5, the modified examples of the recording/reproducing head in the embodiment will be explained. Each of FIG. 3 to FIG. 5 are a perspective view and a cross sectional view conceptually showing a modified example of the structure of the recording/reproducing head in the embodiment.

As shown in FIG. 3(*a*), in a recording/reproducing head 101 in a first modified example, at least one portion of the back side surface of the support member 130 (i.e. the surface on the side where the diamond tip 110 is formed, of the support member 130) is covered with the conductive film 120. Namely, as shown in FIG. 3(*b*) which is a B-B' cross sectional view of the recording/reproducing head 101 in the first modified example, in the recording/reproducing head 101 in the first modified example, the side surfaces of through-holes 140 and the front side surface and back side surface of the support member 130 around the areas where the through-holes 140 are formed are covered with the conductive film 120.

Moreover, as shown in FIG. 4(*a*) and FIG. 4(*b*), in a recording/reproducing head 102 in a second modified example, the surrounding area of the through-holes 140 out of the back side surface of the support member 130 is covered with the conductive film 120. However, the back side of the support member 130 is less covered with the conductive film 120 than that of the recording/reproducing head 101 shown in FIG. 3(*a*) and FIG. 3(*b*). Incidentally, it will be obvious that even on the front side surface of the support member 130 of the recording/reproducing head 100 in the embodiment, the conductive film 120 may be formed like the back side surface of the recording/reproducing head 102 in the second modified example.

As described above, in the case where the back side surface of the support member 130 is covered with the conductive film 120, it is possible to receive the same various benefits as those of the above-mentioned recording/reproducing head 100 in the embodiment. In addition, since the conductive film 120 is formed even on the back side surface of the support member 130, the contact area between the conductive film 120 and the support member 130 can be further increased. By this, better ohmic contact can be achieved on the interface between the conductive film 120 and the support member 130.

Moreover, as shown in FIG. 5, a recording/reproducing head 103 in a third modified example has a depression in at least one portion of the support member 130, and the through-holes 140 are formed in one portion of the depression. Even in such construction, the contact area between the conductive film 120 and the support member 130 is increased by the formation of the depression. By this, it is possible to receive the same various benefits as those of the above-mentioned recording/reproducing head 100 in the embodiment.

Incidentally, the structure that is cut through the support member 130 from the front side to the back side in at least one portion of the support member 130 corresponds to the through-hole 140 in the embodiment, at least. Namely, as long as it is a hole cut through the support member 130 from the front side to the back side, the conductive film 120 can be formed on its side surface, so that the above-mentioned various benefits can be received.

Moreover, a plurality of diamond tips 110 may be provided. At this time, the individual conductive film 120 for supplying the electric current to each of the plurality of diamond tips 110 is preferably formed to cover the surfaces of the through-holes 140 or the like, as described above, and is preferably insulated.

Moreover, if the conductive film is formed together with the through-hole, as described above, on the surface of the diamond substrate (particularly, the diamond substrate provided with electrical conductivity by doping boron or the like), it is possible to preferably apply the electric current to the diamond substrate via the conductive film. Thus, such a device that the electric current needs to be applied to the diamond can employ the above-mentioned structure like the through-hole, and as a result, the device can also receive the above-mentioned various benefits.

(ii) Manufacturing Method of Recording/Reproducing Head

Next, with reference to FIG. 6 to FIG. 24, a manufacturing method of manufacturing the recording/reproducing head in the embodiment will be explained. FIG. 6 to FIG. 24 are cross sectional views or plan views conceptually showing each of the processes of the manufacturing method of manufacturing the recording/reproducing head in the embodiment.

Incidentally, the recording/reproducing head manufactured by the manufacturing method explained herein is the one in which the diamond tip 110 and the support member 130 are unified. However, it will be obvious that even if the diamond tip 110 and the support member 130 are not unified, the recording/reproducing head can be manufactured in the same manufacturing method, and that such manufacturing method is included in the scope of the present invention.

Firstly, as shown in FIG. 6, a silicon substrate 201 is provided. The silicon substrate 201 will be mainly the mold form of the recording/reproducing head. Incidentally, in subsequent processes, it is preferable to provide such a silicon substrate 201 that a silicon dioxide film is formed along (or in parallel with) the (100 surface) of a crystal lattice structure. This is to form the projective (or pyramid) shape of the diamond tip 110 by performing anisotropic etching, as described later (refer to FIG. 10). The silicon substrate 201 is referred to as a (100) substrate.

Then, as shown in FIG. 7, a silicon dioxide ($SiO_2$) film 202 is formed on the surfaces on the front and back sides of the silicon substrate 201. Here, the silicon dioxide film 202 may be formed on the surfaces by locating the silicon substrate 201 in a high-temperature oxidation atmosphere.

Then, as shown in FIG. 8(a), photoresist 203 is coated on the silicon dioxide film 202 by spin coating, for example, and then patterning is performed. Specifically, after the photoresist 203 is coated on the silicon dioxide film 202, which is formed on one side of the silicon substrate 201, ultraviolet rays or the like are irradiated by using a photo mask which is patterned in accordance with the portion corresponding to the substrate 110. After that, by developing it, the patterning of the photoresist 203 is performed, as shown in FIG. 8(a). Of course, the patterning may be performed by using EB (Electron Beam) resist and other materials, for example.

Incidentally, FIG. 8(b) is a view showing the silicon substrate 201 and the like in FIG. 8(a) viewed from the top side (i.e. the side where the photoresist 203 is patterned). As shown in FIG. 8(b), in the portion where the diamond tip 110 of the recording/reproducing head 100 is formed, a window is formed by not applying the photoresist 203, so that the silicon dioxide film 202 can be seen. The diamond tip 110 is formed in accordance with the shape of the window.

Then, as shown in FIG. 9(a), etching is performed on the silicon substrate 201 on which the patterning of the photoresist 203 is performed in FIG. 8. The etching herein is performed in the portion where the photoresist 203 is not applied, out of the silicon dioxide film 202, by using BHF (Buffered HydroFluoric acid) and HF (HydroFluoric acid), for example. However, the etching may be performed by using another etchant, or the etching may be performed by dry etching.

After the etching of the silicon dioxide film 202, the photoresist 203 is removed. Here, the photoresist 203 may be removed by dry etching or wet etching.

FIG. 9(b) is a view showing the silicon substrate 201 and the like in FIG. 9(a) viewed from the top side. As shown in FIG. 9(b), in the portion where the diamond tip 110 is formed, a window is formed by removing the silicon dioxide film 202, so that the silicon substrate 201 can be seen.

Then, as shown in FIG. 10(a), anisotropic etching is performed on the silicon substrate 201. Here, the anisotropic etching is performed by using alkaline etchant, such as TMAH (tetramethylammonium hydroxide) and KOH (potassium hydroxide), for example.

At this time, the silicon substrate 201 has such a character that the etching progresses in the normal direction of the (100) surface (i.e. a direction perpendicular to the silicon substrate 201 in FIG. 10(a)), whereas it is hard that the etching progresses in the normal direction of a (111) surface (i.e. a direction of about 45 degrees with respect to the silicon substrate 201 in FIG. 10(a)). The anisotropic etching is performed by using this character, to thereby etch the substrate 110 in the shape corresponding to the diamond tip 110 (i.e. in the projective or pyramid shape).

Incidentally, FIG. 10(b) is a view showing the silicon substrate 201 and the like in FIG. 10(a) viewed from the top side. As shown in FIG. 10(b), the anisotropic etching is performed on the silicon substrate 201, and the etching speed is smaller in the outer portion of the window of the silicon dioxide film 202, whereas the etching speed is larger in the portion of the center portion of the window. As a result, the hole formed by the etching has a sharp-pointed tip.

Then, as shown in FIG. 11(a), the photoresist 203 is sprayed again for the patterning.

At this time, particularly in the embodiment, the patterning is performed to form the through-holes 140. Specifically, the photoresist 203 remains in the portion where the through-holes 140 are to be formed, out of the support member 130. By changing the patterning of the photoresist 203 (or the shape of the remaining photoresist 203), as occasion demands, it is possible to form the through-holes 140 in a desired shape, and form the desired number of the through-holes 140.

For example, as explained in the above-mentioned FIG. 2, the patterning of the photoresist 203 is preferably performed so as to form such through-holes 140 that one specific example of the equation expressing the increase of the contact area, i.e. "2t(a+b)−ab", indicates a positive numerical value. For example, if "t=5 μm" and "a=b (i.e. the through-hole 140 is a square)", the patterning of the photoresist 203 is preferably performed so as to satisfy "2×5×(a+a)−a×a>0". From this equation, "a>20 μm" is derived. Namely, the photoresist 203 left for the formation of the through-holes 140 is preferably patterned to make a square 20 μm or more on a side. Due to this photoresist 203, the through-holes 140, having 20 μm or more on a side, are formed through subsequent processes.

Incidentally, FIG. 11(b) is a view showing the silicon substrate 201 and the like in FIG. 11(a) viewed from the top side. As shown in FIG. 11(b), the photoresist 203 at this time is patterned in accordance with the shape of the support member 130 (particularly, the support member 130 in which the through-holes 140 are formed).

Then, as shown in FIG. 12(a), the silicon dioxide film 202 is etched in accordance with the pattering of the photoresist 203 in FIG. 11, and then, the photoresist 203 is removed. Here, the etching is performed in the same procedure as in FIG. 9.

Incidentally, FIG. 12(b) is a view showing the silicon substrate 201 and the like in FIG. 12(a) viewed from the top side. As shown in FIG. 12(b), the silicon dioxide film 202 remains in accordance with the shape of the support member 130 (particularly, the support member 130 in which the through-holes 140 are formed). At this time, the embossment of the silicon dioxide film 202 left for the formation of the through-holes 140 corresponds to one specific example of the "predetermined physical shape" of the present invention.

Then, as shown in FIG. 13, in methanol containing diamond powders, the diamond powders are vibrated by using ultrasound or the like, for example, to thereby scratch the surface of the silicon substrate 201 and the surface of the silicon dioxide film 202 formed thereon. Scratching the surfaces in this manner allows the formation of diamond nuclei in a subsequent process (refer to FIG. 14).

Then, as shown in FIG. 14, a diamond film is grown by hot filament CVD (Chemical Vapor Deposition). For example, with $CH_4$ (methane) gas as a raw material, the diamond film is formed on the silicon substrate 201. In particular, the diamond film grows in the portions scratched in the process in FIG. 13. Incidentally, instead of the hot filament CVD, for example, microwave plasma CVD or another film growth method or the like may be used to grow the diamond film.

Moreover, the diamond film is used as the diamond tip 110 and the support member 130 described above, so that it needs to have electrical conductivity. Therefore, B (boron) is doped into the diamond film by adding doping gas, such as, for example, $B_2H_6$ (diborane) and $(CH_3O)_3B$ (trimethoxyborane).

Incidentally, not limited to the method of growing the diamond film by the scratching process, as shown in FIG. 13, the diamond film may be grown by applying a negative bias voltage to the silicon substrate 201 at the initial stage of the CVD process. Alternatively, superfine particles of diamond powders may be applied onto the silicon substrate 201 to use them as the nuclei for the growth of the diamond film.

Then, as shown in FIG. 15, the diamond particles growing on the silicon dioxide film 202 are removed. In this regard, a slight amount of silicon dioxide film 202 is removed by the etching using, e.g., BHF or the like, resulting in the removal of the diamond particles. By this, it is possible to form the diamond tip 110 and the support member 130 in proper shapes.

Then, as shown in FIG. 16, the diamond film is further grown by using, e.g., the hot filament CVD or the like, to thereby form the diamond tip 110 and the support member 130.

Particularly in the embodiment, in order to form the support member 130 (i.e. the support member 130 in which the through-holes 140 are formed), the diamond is selectively formed. Thus, the desired through-holes 140 can be relatively easily formed in accordance with the patterning of the photoresist 203. Namely, a special manufacturing process (e.g. a fine physical machining process, another machining process or the like, and specifically, a drilling or hole-making process by a FIB (Focused Ion Beam) or a drilling process by etching using oxygen plasma, etc.) is not necessary for the formation of the through-holes 140, and the through-holes 140 can simultaneously formed in the normal manufacturing process for the formation of the support member 130. Therefore, according to the manufacturing method in the embodiment, the recording/reproducing head in the embodiment can be mass-produced, relatively inexpensively and relatively easily.

The selective formation of the diamond is preferably performed only for a preferable time length, so as not to grow the diamond to or over the thickness of the silicon dioxide film 202 left as a result of the patterning of the photoresist 203. Namely, this is because, if the diamond is grown to or over the thickness of the silicon dioxide film 202, it likely blocks the through-holes 140. In other words, in accordance with the thickness of the support member 130 which is expectedly formed, the silicon dioxide film 202 with a desired thickness is preferably formed in advance in the process explained by using FIG. 7, or the silicon dioxide film 202 with a desired thickness is preferably left in the process explained by using FIG. 12.

However, as shown in FIG. 17, the diamond may be selectively grown so as to cover at least one portion of the top portion of the silicon dioxide film 202 to the extent that the through-holes 140 are not blocked. The selective growth of the diamond in this manner allows the formation of the conductive film 120 up to the back side of the diamond, which is selectively grown so as to cover the at least one portion, in a formation process of forming the conductive film 120 described later. By this, the contact area between the conductive film 120 and the support member 130 can be further increased.

Incidentally, here, the support member 130 and the diamond tip 110 are unified. Thus, the explanation below will be given as the diamond tip 110 including the function as the support member 130.

Then, after the diamond tip 110 is formed, as shown in FIG. 18(a), the etching is performed, to thereby remove the silicon dioxide film 202. Here, for example, BHF, HF or the like is used to remove the silicon dioxide film 202.

Incidentally, FIG. 18(b) is a view showing the silicon substrate 201 and the like in FIG. 18(a) viewed from the top side. As shown in FIG. 18(b), it can be seen that the through-holes 140 are formed by removing the silicon dioxide film 202.

Then, as shown in FIG. 19(a) and FIG. 19(b), a metal film having electrical conductivity is applied onto at least one portion of the upper side surface of the support member 130 (i.e. the front side surface in this case), to thereby form the conductive film 120. For example, deposition, spattering or the like may be used to form the conductive film 120. At this time, metal or the like is deposited so as to apply the conductive film 120 onto the side surfaces of the through-holes 140.

Incidentally, in order to increase the adherence of the conductive film 120 with respect to the support member 130 including the diamond, a foundation, such as titanium, is preferably deposited before the deposition of the metal or the like, which is the material of the conductive film 120, to thereby form the conductive film 120. By this, it is possible to increase the adherence between the conductive film 120 and the support member 130 including the diamond, and form the conductive film 120 which hardly exfoliates.

Then, as shown in FIG. 19, a top board 150 having a predetermined shape is applied to the support member 130. The top board 150 is a member for supporting or holding the entire recording/reproducing head 100, and is applied onto the support member 130 by using photosensitive polyimide as an adhesive. Then, for example, an actuator or the like is connected to the top board 150. By this, the entire recording/reproducing head 100 can be displaced on a dielectric recording medium at the time of recording/reproduction operation of a dielectric recording/reproducing apparatus described later.

Incidentally, if predetermined processing is performed on the top board 150, a cut or notch or the like may be formed in view of convenience of the processing. Moreover, the top board 150 has a hole for connecting a wire to the conductive film formed in the through-holes 140, and a not-illustrated hole for the connecting a wire to the diamond tip 110.

Then, as shown in FIG. 20, in order to form the wire, metal, such as, for example, aluminum, chromium and gold, or alloy of these (or the above-mentioned alloy, such as platinum palladium and platinum iridium) or the like is deposited onto the top board 150. At this time, metal or the like is preferably deposited, after the patterning of the photoresist 203 or the like is performed to the portion except the portion where the wire is to be formed. Then, as a result of the deposition, as shown in FIG. 20, the wire is formed on the top board 150.

Then, as shown in FIG. 21, the silicon substrate 201 is removed. Here, ICP-RIE (Inductively Coupled Plasma Reactive Ion Etching) or plasma CVD with $SF_6$ as an etching gas is used to remove the silicon substrate 201 from the diamond tip 110 and the return electrode 150. By this, the recording/reproducing head in the embodiment is manufactured.

(iv) Modified Examples of Manufacturing Method

Next, with reference to FIG. 23 and FIG. 24, a modified example of the manufacturing method in the embodiment will be explained. Each of FIG. 23 and FIG. 24 is a cross sectional view and a plan view conceptually showing each process of the manufacturing method of the recording/reproducing head in the modified example.

As shown in FIG. 23, by performing isotropic etching in removing the silicon dioxide film 202 (the above-mentioned process in FIG. 18) after the selective growth of the diamond, the silicon dioxide film 202 may be removed so as to bore the lower side of the selectively grown diamond.

As a result, as shown in FIG. 24, when the conductive film 120 is formed, metal or the like is deposited up to the back side of the diamond (i.e. the support member), and thus the recording/reproducing head shown in FIG. 3 and FIG. 4 described above can be manufactured. Namely, it is possible to manufacture the recording/reproducing head in which the contact area between the conductive film 120 and the support member 130 is further increased.

Incidentally, the manufacturing method explained in FIG. 6 to FIG. 24, i.e. the manufacturing method in the embodiment, is merely one specific example. The raw materials and various methods (e.g. the etching method, film forming method, and film growth method) used in each process can be changed, as occasion demands.

(2) Embodiment of Recording/Reproducing Apparatus

Next, a recording/reproducing apparatus which uses the above-mentioned recording/reproducing head in the embodiment will be explained.

(i) Basic Structure

Firstly, the basic structure of a dielectric recording/reproducing apparatus in this embodiment will be explained, with reference to FIG. 25. FIG. 25 is a block diagram conceptually showing the basic structure of the dielectric recording/reproducing apparatus in the embodiment.

A dielectric reproducing/reproducing apparatus 1 is provided with: a probe 11 for applying an electric field, with its tip portion facing or opposed to a dielectric material 17 of a dielectric recording medium 20; a return electrode 12 for returning thereto a high-frequency electric field for signal reproduction, applied from the probe 11; an inductor L disposed between the probe 11 and the return electrode 12; an oscillator 13 which oscillates at a resonance frequency determined from the inductor L and a capacitance Cs of a portion which is polarized in accordance with record information and which is formed in the dielectric material 17 under the probe 11; an alternating current (AC) signal generator 21 for applying an alternating electric field to detect the state of the polarization recorded in the dielectric material 17; a record signal generator 22 for recording the polarization state into the dielectric material; a switch 23 for changing the outputs of the AC signal generator 21 and the record signal generator 22; a HPF (High Pass Filter) 24; a demodulator 30 for demodulating a FM signal modulated by the capacitance corresponding to the polarization state owned by the dielectric material 17 under the probe 11; a signal detector 34 for detecting data from the demodulated signal; a tracking error detector 35 for detecting a tracking error signal from the demodulated signal; and the like.

As the probe 11, the above-mentioned recording/reproducing head 100 in the embodiment or the like is used. The conductive film 120 out of the probe 11 is connected to the oscillator 13 through the HPF 24, and is connected to the AC signal generator 21 and the record signal generator 22 through the HPF 24 and the switch 23. Then, it functions as an electrode for applying an electrical field to the dielectric material 17. Incidentally, as the probe 11, for example, a needle type shown in FIG. 1 and the like, or a cantilever type or the like is known as its specific shape.

Incidentally, a plurality of probes 11 may be provided. In this case, a plurality of AC signal generators 21 are preferably provided in association with the probes 11. Moreover, in order to discriminate reproduction signals corresponding to the AC signal generators 21 on the signal detector 34, it is preferable that a plurality of signal detectors 34 are provided, and that the signal detectors 34 obtain reference signals from the respective AC signal generators 21, to thereby output the corresponding reproduction signals.

Then, the diamond tip 110 and the conductive film 120 need to be insulated for each probe 11. If the support member 130 has electrical conductivity, the support member 130 also needs to be insulated for each probe 11. However, if the support member 130 does not have electrical conductivity, the support member 130 common to the diamond tip 110 and the conductive film 120 may be provided.

The return electrode 12 is an electrode for returning thereto the high-frequency electric field applied to the dielectric material 17 from the probe 11 (i.e. a resonance electric field from the oscillator 13), and is disposed to surround the probe 11. Incidentally, the shape and placement of the return electrode 12 can be arbitrarily set, if the high-frequency electric field returns to the return electrode 12 without resistance.

The inductor L is disposed between the probe 11 and the return electrode 12, and may be formed from a microstripline, for example. A resonance circuit 14 is constructed including the inductor L and the capacitance Cs. The inductance of the inductor L is determined such that this resonance frequency is a value which is centered on approximately 1 GHz, for example.

The oscillator 13 is an oscillator which oscillates at the resonance frequency determined from the inductor L and the capacitance Cs. The oscillation frequency varies, depending on the change of the capacitance Cs. Therefore, FM modulation is performed correspondingly to the change of the capacitance Cs determined by a polarization domain corresponding to the recorded data. By demodulating this FM modulation, it is possible to read the data recorded in the dielectric recording medium 20.

Incidentally, as described in detail later, the probe 11, the return electrode 12, the oscillator 13, the inductor L, the HPF 24, and the capacitance Cs of the dielectric material 17 constitute the resonance circuit 14, and the FM signal amplified in the oscillator 13 is outputted to the demodulator 30.

The AC signal generator 21 applies an alternating electric field between the return electrode 12 and an electrode 16. Moreover, in the dielectric recording/reproducing apparatus which uses a plurality of probes 11, the frequencies of the alternating electric fields are used as reference signals for synchronization, to thereby discriminate signals detected with the probes 11. The frequencies are centered on about 5 kHz. In that condition, the alternating electric fields are applied to the domains of the dielectric material 17.

The record signal generator 22 generates a signal for recording and supplies it to the probe 11 at the time of recording. This signal is not limited to a digital signal and it may be an analog signal. The signal includes various signals, such as audio information, video information, and digital data for a computer. Moreover, the AC signal superimposed on the record signal is used to discriminate and reproduce the information on each probe, as the reference signal at the time of signal reproduction.

The switch 23 selects the output so as to supply, to the probe 11, the signal from the AC signal generator 21 at the time of reproduction and the signal from the record signal generator 23 at the time of recording. For this apparatus, a mechanical relay and a semiconductor circuit are used. The switch 23 is preferably constructed from the relay in the case of the analog signal, and the semiconductor circuit in the case of the digital signal.

The HPF 24 includes an inductor and a condenser, and is used to form a high pass filter for cutting off a signal system so that the signals from the AC signal generator 21 and the record signal generator 22 do not interfere with the oscillation of the oscillator 13. The cutoff frequency is $f=\frac{1}{2}\pi\sqrt{\{LC\}}$. Here, L is the inductance of the inductor included in the HPF 24, and C is the capacitance of the condenser included in the HPF 24. The frequency of the AC signal is about 5 KHz, and the oscillation frequency of the oscillator 13 is about 1 GHz. Thus, the separation is sufficiently performed with the first order LC filter. A higher-order filter may be used, but the number of elements increases, so that there is a possibility that the apparatus becomes bigger.

The demodulator 30 demodulates the oscillation frequency of the oscillator 13, which is FM-modulated due to the small change of the capacitance Cs, and reconstructs a waveform corresponding to the polarized state of a portion which is traced by the prove 11. If the recorded data are digital data of "0" and "1", there are two types of frequencies to be demodulated. By judging the frequency, the data reproduction is easily performed.

The signal detector 34 reproduces the recorded data from the signal demodulated on the demodulator 30. A lock-in amplifier is used as the signal detector 34, for example, and coherent detection or synchronized detection is performed on the basis of the frequency of the alternating electric field of the AC signal generator 21, to thereby reproduce the data. Incidentally, it will be obvious that another phase detection device may be used.

The tracking error detector 35 detects a tracking error signal for controlling the apparatus, from the signal demodulated on the demodulator 30. The detected tracking error signal is inputted into a tracking mechanism for the control.

Next, one example of the dielectric recording medium 20 shown in FIG. 25 will be explained with reference to FIG. 26. FIG. 26 are a plan view and a cross sectional view conceptually showing one example of the dielectric recording medium 20 used in the embodiment.

As shown in FIG. 26(a), the dielectric recording medium 20 is a disc-shaped dielectric recording medium, and is provided with: for example, a center hole 10; and an inner area 7, a recording area 8, and an outer area 9, which are located concentrically from the center hole 10 in this order. The center hole 10 is used if the dielectric recording medium 20 is mounted on a spindle motor or in a similar case.

The recording area 8 is an area to record the data therein and has tracks and spaces between the tracks. Moreover, on the tracks and the spaces, there is an area to record therein control information associated with the record and reproduction. Furthermore, the inner area 7 and the outer area 9 are used to recognize the inner position and the outer position of the dielectric recording medium 20, respectively, and can be used as areas to record therein information about the data to be recorded, such as a title, its address, a recording time length, and a recording capacity. Incidentally, the above-described structure is one example of the dielectric recording medium 20, and another structure, such as a card-shape, can be also employed.

Moreover, as shown in FIG. 26(b), the dielectric recording medium 20 is formed such that the electrode 16 is laminated on a substrate 15 and that the dielectric material 17 is laminated on the electrode 16.

The substrate 15 is Si (silicon), for example, which is a preferable material in its strength, chemical stability, workability, or the like. The electrode 16 is intended to generate an electric field between the electrode 16 and the probe 11 (or the return electrode 12). By applying such an electric field which is equal to or stronger than the coercive electric field of the dielectric material 17 to the dielectric material 17, the polarization direction is determined. By determining the polarization direction in accordance with the data, the recording is performed.

The dielectric material 17 is formed onto the electrode 16 by a known technology, such as spattering $LiTaO_3$ or the like, which is a ferroelectric substance. Then, the recording is performed with respect to the Z surface of $LiTaO_3$ in which the plus and minus surfaces of the polarization have a 180-degree domain relationship. It will be obvious that another dielectric material may be used. In the dielectric material 17, the small polarization is formed at high speed, by a voltage for data, which is applied simultaneously with a direct current bias voltage.

Moreover, as the shape of the dielectric recoding medium 20, for example, there are a disc shape and a card shape and the like. The displacement of the relative position with respect to the probe 11 is performed by the rotation of the medium, or by displacing either the probe 11 or the medium linearly.

(ii) Operation Principle

Next, with reference to FIG. 27 and FIG. 28, the operation principle of the dielectric recording/reproducing apparatus 1 in the embodiment will be explained. Incidentally, in the explanation below, one portion of the constituent elements of the dielectric recording/reproducing apparatus 1 shown in FIG. 25 is extracted and explained.

(Recording Operation)

Firstly, with reference to FIG. 27, the recording operation of the dielectric recording/reproducing apparatus in the embodiment will be explained. FIG. 27 is a cross sectional view conceptually showing the information recording operation.

As shown in FIG. 27, by applying an electric field which exceeds the coercive electric field of the dielectric material 17 between the probe 11 and the electrode 16, the dielectric material 17 is polarized having a direction corresponding to the direction of the applied electric field. Then, by controlling an applying voltage to thereby change the polarization direction, it is possible to record the predetermined information. This uses such a characteristic that the polarization direction is reversed if an electric field which exceeds the coercive electric field of a dielectric substance is applied to the dielectric substance (particularly, a ferroelectric substance), and that the polarization direction is maintained.

For example, it is assumed that when an electric field which directs from the probe 11 to the electrode 16 is applied, the micro domain has downward polarization P, and that when an electric field which directs from the electrode 16 to the probe 11 is applied, the micro domain has upward polarization P.

This corresponds to the state that the data information is recorded. If the probe 11 is operated in an arrow-pointing direction, a detection voltage is outputted as a square wave which swings up and down in accordance with the polarization P. Incidentally, this level changes depending on the polarization extent of the polarization P, and can be recorded as an analog signal.

Particularly in the embodiment, the above-mentioned recording/reproducing head 100 or the like in the embodiment is used as the probe 11, so that the resistance on the interface between the conductive film 120 and the support member 130 can be reduced. Thus, it is possible to realize the stable recording operation.

(Reproduction Operation)

Next, with reference to FIG. 28, the reproduction operation of the dielectric recording/reproducing apparatus 1 in the embodiment will be explained. FIG. 28 is a cross sectional view conceptually showing the information reproduction operation.

The nonlinear dielectric constant of a dielectric substance changes in accordance with the polarization direction of the dielectric substance. The nonlinear dielectric constant of the dielectric substance can be detected as a difference in the capacitance of the dielectric substance or a difference in the change of the capacitance of the dielectric substance, when an electric field is applied to the dielectric substance. Therefore, by applying an electric field to the dielectric material and by detecting a difference in the capacitance Cs or a difference in the change of the capacitance Cs in a certain domain of the dielectric material at that time, it is possible to read and reproduce the data recorded as the polarization direction of the dielectric material.

Specifically, firstly, as shown in FIG. 28, an alternating electric field from the not-illustrated AC signal generator 21 is applied between the electrode 16 and the probe 11. The alternating electric field has an electric field strength which does not exceed the coercive electric field of the dielectric material 17, and has a frequency of approximately 5 kHz, for example. The alternating electric field is generated mainly to discriminate the difference in the change of the capacitance corresponding to the polarization direction of the dielectric material 17. Incidentally, instead of the alternating electric field, a direct current bias voltage may be applied to form an electric field in the dielectric material 17. The application of the alternating electric field causes the generation of an electric field in the dielectric material 17 of the dielectric recording medium 20.

Then, the probe 11 is put closer to a recording surface until the distance between the tip of the probe 11 and the recording surface becomes extremely small on the order of nanometers. Under this condition, the oscillator 13 is driven. Incidentally, in order to detect the capacitance Cs of the dielectric material 17 under the probe 11 highly accurately, it is preferable to contact the probe 11 with the surface of the dielectric material 17, i.e. the recording surface. However, in order to read the data recorded in the dielectric material 17 at high speed, it is necessary to relatively displace the probe 11 at high speed on the dielectric recording medium 20. Thus, considering the possibility of the high-speed displacement, the prevention of damage caused by collision and friction between the probe 11 and the dielectric recording medium 20, or the like, it is practically better to put the probe 11 closer to the recording surface to the extent that it can be regarded as the contact than contact the probe 11 with the recording surface.

Then, the oscillator 13 oscillates at the resonance frequency of the resonance circuit, which includes the inductor L and the capacitance Cs associated with the dielectric material 17 under the probe 11 as the constituent factors. The center frequency of the resonance frequency is set to approximately 1 GHz, as described above.

Here, the return electrode 12 and the probe 11 constitute one portion of the oscillation circuit 14 including the oscillator 13. The high-frequency signal of approximately 1 GHz, which is applied to the dielectric material 17 from the probe 11, passes through the dielectric material 17 and returns to the return electrode 12, as shown by solid lines in FIG. 28. By disposing the return electrode 12 in the vicinity of the probe 11 and shortening a feedback route to the oscillation circuit including the oscillator 13, it is possible to reduce the noise (e.g. a floating capacitance component) entering the oscillation circuit.

In addition, the change of the capacitance Cs corresponding to the nonlinear dielectric constant of the dielectric material 17 is extremely small. In order to detect this change, it is necessary to adopt a detection method having high detection accuracy. In a detection method using FM modulation, the high detection accuracy can be generally obtained, but it is necessary to further improve the detection accuracy, in order to make it possible to detect the small capacitance change corresponding to the nonlinear dielectric constant of the dielectric material 17. Thus, in the dielectric recording/reproducing apparatus in the embodiment (i.e. recording/reproducing apparatus which uses the SNDM principle), the return electrode 12 is located in the vicinity of the probe 11 to shorten the feedback route to the oscillation circuit as much as possible. By this, it is possible to obtain extremely high detection accuracy, and thus it is possible to detect the small capacitance change corresponding to the nonlinear dielectric constant of the dielectric substance.

After the oscillator 13 is driven, the probe His displaced in parallel with the recording surface on the dielectric recording medium 20. By the displacement, the domain of the dielectric material 17 under the probe His changed, and whenever the polarization direction thereof changes, the capacitance Cs changes. If the capacitance Cs changes, the resonance frequency, i.e. the oscillation frequency of the oscillator 13, changes. As a result, the oscillator 13 outputs a signal which is FM-modulated on the basis of the change of the capacitance Cs.

This FM signal is frequency-voltage converted by the demodulator 30. As a result, the change of the capacitance Cs is converted to the extent of the voltage. The change of the capacitance Cs corresponds to the nonlinear dielectric constant of the dielectric material 17, and the nonlinear dielectric constant corresponds to the polarization direction of the dielectric material 17, and the polarization direction corresponds to the data recorded in the dielectric material 17. Therefore, the signal obtained from the demodulator 30 is such a signal that the voltage changes in accordance with the data recorded in the dielectric recording medium 20. Moreover, the signal obtained from the demodulator 30 is supplied to the signal detector 34, and, for example, coherent detection or synchronized detection is performed, to thereby extract the data recorded in the dielectric recording medium 20.

At this time, on the signal detector 34, an alternating current signal generated by the AC signal generator 21 is used as the reference signal. By this, for example, even if the signal obtained from the demodulator 30 includes many noises or the data to be extracted is a weak signal, the data can be extracted highly accurately by performing the synchronization with the reference signal, as described later.

Particularly in the embodiment, the recording/reproducing head 100 or the like shown in FIG. 1 or the like is used as the probe 11. Thus, the resistance on the interface between the conductive film 120 and the support member 130 can be reduced. Therefore, good ohmic resistance can be achieved on the interface between the conductive film 120 and the support member 130 which are incorporated in the oscillation circuit, so that there is such an advantage that the oscillation of the oscillation circuit is not attenuated at all or hardly attenuated. Namely, it is possible to stabilize the oscillation of the oscillation circuit, to thereby realize the stable reproduction operation.

Moreover, in the above-mentioned embodiment, the dielectric material 17 is used as the recording layer. From the viewpoint of the presence or absence of the nonlinear dielectric constant and spontaneous polarization, the dielectric material 17 is preferably a ferroelectric substance.

Moreover, in the present invention, various changes may be made, if desired, without departing from the essence or spirit of the invention which can be read from the claims and the entire specification. A probe, a manufacturing method of the recording/reproducing head, a recording apparatus, and a reproducing apparatus, are also intended to be within the technical scope of the present invention.

INDUSTRIAL APPLICABILITY

The probe, and the manufacturing method of the probe of the present invention can be applied to, for example, a probe used as a recording/reproducing head for recording and reproducing polarization information recorded in a dielectric substance, such as a ferroelectric recording medium, and moreover to a manufacturing method the probe. The recording apparatus and the reproducing apparatus which use the probe of the present invention can be applied to a recording/reproducing apparatus which uses SNDM.

The invention claimed is:

1. A probe comprising:
    a support member having a through-hole in at least one portion thereof;
    a projection standing on said support member with its tip facing a medium; and
    a conductive film formed to cover at least a partial surface of said support member including a side surface of the through-hole.

2. The probe according to claim 1, wherein a plurality of through-holes are formed.

3. The probe according to claim 1, wherein
    said support member has a depression portion including the through-hole in at least one portion thereof, and
    said conductive film is formed to cover at least a partial surface of the depression portion.

4. The probe according to claim 3, wherein plurality of depression portions are formed.

5. The probe according to claim 1, wherein an area of the side surface of the through-hole is greater than an area of a cross section of the through-hole.

6. The probe according to claim 1, wherein said support member is relatively thick.

7. The probe according to claim 1, wherein a contact area between said conductive film and said support member is greater than that in a case where the through-hole is not formed.

8. The probe according to claim 1, wherein said conductive film is formed to cover at least one surface of a front side surface and a back side surface of said support member in which the through-hole is formed, and to cover the side surface of the through-hole.

9. The probe according to claim 1, wherein said support member includes diamond.

10. The probe according to claim 9, wherein said support member is formed by selective growth of the diamond.

11. A manufacturing method for manufacturing the probe according to claim 1, said manufacturing method comprising:
    a first forming process of forming a mold, which is to form at least said support member and which has a predetermined physical shape for forming the through-hold in at least one portion of said support member;
    a second forming process of forming said support member by using the mold; and
    a third forming process of forming said conductive film on at least a partial surface of said support member including the side surface of the through-hole.

12. The manufacturing method according to claim 11, wherein the predetermined physical shape is thicker than said support member.

13. The manufacturing method according to claim 11, wherein
    at least said support member includes diamond, and
    said second forming process forms said support member by selective formation of the diamond.

14. The manufacturing method according to claim 11, wherein in said third process, isotropic etching is performed on at least one portion of the mold, and said conductive film is formed on an upper side surface of said support member.

15. A recording apparatus for recording data into a dielectric recording medium, said recording apparatus comprising:
    the probe according to claim 1; and
    a record signal generating device for generating a record signal corresponding to the data.

16. A reproducing apparatus for reproducing data recorded in a dielectric recording medium, said reproducing apparatus comprising:
    the probe according to claim 1;
    an electric field applying device for applying an electric field to the dielectric recording medium;
    an oscillating device whose oscillation frequency varies depending on a difference in capacitance corresponding to a nonlinear dielectric constant of the dielectric recording medium; and
    a reproducing device for demodulating an oscillation signal generated by said oscillating device and reproducing the data.

17. A recording/reproducing apparatus for recording data into a dielectric recording medium and reproducing the data recorded in the dielectric recording medium, said recording/reproducing apparatus comprising:
    the probe according to claim 1;
    a record signal generating device for generating a record signal corresponding to the data;
    an electric field applying device for applying an electric field to the dielectric recording medium;
    an oscillating device whose oscillation frequency varies depending on a difference in capacitance corresponding to a nonlinear dielectric constant of the dielectric recording medium; and
    a reproducing device for demodulating an oscillation signal generated by said oscillating device and reproducing the data.

* * * * *